(12) United States Patent
Yu et al.

(10) Patent No.: US 12,723,842 B2
(45) Date of Patent: Sep. 1, 2026

(54) DOT SIGHT

(71) Applicant: ZHUHAI MEFO OPTICAL INSTRUMENTS CO LTD., Zhuhai (CN)

(72) Inventors: Xiping Yu, Zhuhai (CN); Jiyuan Tian, Zhuhai (CN); Hui Yang, Zhuhai (CN); Dayun Lin, Zhuhai (CN); Yinquan He, Zhuhai (CN)

(73) Assignee: ZHUHAI MEFO OPTICAL INSTRUMENTS CO LTD., Zhuhai (CN)

( * ) Notice: Subject to any disclaimer, the term of this patent is extended or adjusted under 35 U.S.C. 154(b) by 288 days.

(21) Appl. No.: 18/625,264

(22) Filed: Apr. 3, 2024

(65) Prior Publication Data

US 2024/0263915 A1 Aug. 8, 2024

Related U.S. Application Data

(63) Continuation of application No. PCT/CN2023/091802, filed on Apr. 28, 2023.

(30) Foreign Application Priority Data

Aug. 5, 2022 (CN) ......................... 202210937032.9

(51) Int. Cl.
*F41G 1/30* (2006.01)
*G02B 23/04* (2006.01)
(Continued)

(52) U.S. Cl.
CPC ............... *F41G 1/30* (2013.01); *G02B 23/04* (2013.01); *G02B 27/20* (2013.01); *G02B 27/30* (2013.01)

(58) Field of Classification Search
CPC ..... F41G 1/30; F41G 1/26; F41G 1/28; F41G 1/14; F41G 1/46; G02B 23/04; G02B 27/20; G02B 27/30
(Continued)

(56) References Cited

U.S. PATENT DOCUMENTS 3,897,158 A 7/1975 Steck, III
6,967,775 B1 11/2005 Millett
(Continued)

FOREIGN PATENT DOCUMENTS

CH 667150 A5 9/1988
CN 109798806 A 5/2019
(Continued)

*Primary Examiner* — William R Alexander
(74) *Attorney, Agent, or Firm* — Bayramoglu Law Offices LLC

(57) ABSTRACT

A dot sight includes a sight mount, a sight frame, a light source member, a collimator lens set, a reflector, and a beam splitter prism, where a first chamber is formed in the sight mount; the sight frame is provided at a circumferential side of the sight mount close to an eye side; a second chamber, and a through opening communicating the second chamber and the first changer are formed in the sight frame; the light source member is provided at an end of the first chamber close to an object side, and configured to emit light to the eye side; the collimator lens set is provided in the first chamber; the reflector is provided in the first chamber, and corresponding to the through opening; the beam splitter prism is provided in the second chamber; and an axial position of the light source member is adjustable.

18 Claims, 14 Drawing Sheets

(51) Int. Cl.
*G02B 27/20* (2006.01)
*G02B 27/30* (2006.01)

(58) Field of Classification Search
USPC .......................................................... 359/399
See application file for complete search history.

(56) References Cited

U.S. PATENT DOCUMENTS

| | | | | |
|---|---|---|---|---|
| 9,069,172 | B1 * | 6/2015 | Morley | H01J 31/49 |
| 10,330,439 | B2 | 6/2019 | Jeung | |
| 10,488,646 | B2 * | 11/2019 | Derushia | G02B 23/145 |
| 10,534,166 | B2 * | 1/2020 | Summerfield | G02B 27/142 |
| 10,655,932 | B2 * | 5/2020 | Jeung | F41G 1/30 |
| 10,948,264 | B1 * | 3/2021 | Brumfield | F41G 1/30 |
| 11,092,796 | B2 * | 8/2021 | Hodelin | F41G 1/36 |
| 2009/0168057 | A1 | 7/2009 | Gerlach | |
| 2009/0265974 | A1 * | 10/2009 | Joannes | F41G 1/30 235/404 |
| 2012/0033195 | A1 * | 2/2012 | Tai | F41G 3/165 359/633 |
| 2012/0097741 | A1 * | 4/2012 | Karcher | F41G 1/473 235/404 |
| 2012/0262615 | A1 * | 10/2012 | Gaber | H04N 23/11 348/311 |
| 2013/0333266 | A1 * | 12/2013 | Gose | G01J 1/0219 348/340 |
| 2014/0075820 | A1 * | 3/2014 | Ben-Ami | F41G 1/30 42/131 |
| 2019/0041626 | A1 * | 2/2019 | Derushia | F41G 1/00 |
| 2019/0129162 | A1 * | 5/2019 | Hodelin | F41G 1/38 |
| 2019/0204047 | A1 * | 7/2019 | Jeung | F41G 1/30 |
| 2019/0219813 | A1 * | 7/2019 | Summerfield | F41G 1/345 |
| 2019/0242675 | A1 * | 8/2019 | Flaster | F41G 1/35 |
| 2019/0376764 | A1 * | 12/2019 | Hammond | F41G 1/38 |
| 2020/0103659 | A1 * | 4/2020 | Ouderkirk | G02B 27/283 |
| 2020/0386516 | A1 * | 12/2020 | Libotte | F41G 1/38 |
| 2021/0372737 | A1 * | 12/2021 | Masarik | F41G 3/06 |
| 2023/0176388 | A1 * | 6/2023 | Parker | G02B 27/0081 359/13 |

FOREIGN PATENT DOCUMENTS

| | | | |
|---|---|---|---|
| CN | 213688067 | U | 7/2021 |
| CN | 115371493 | A | 11/2022 |

* cited by examiner

DOT SIGHT

CROSS REFERENCE TO RELATED APPLICATIONS

This application is a continuation application of International Application No. PCT/CN2023/091802, filed on Apr. 28, 2023, which is based upon and claims foreign priority to Chinese Patent Application No. 202210937032.9, filed on Aug. 5, 2022, the entire contents of which are incorporated herein by reference.

TECHNICAL FIELD

The present application belongs to the technical field of sights, and in particular relates to a dot sight.

BACKGROUND

At present, a dot sight usually includes a light source, a reflector, a collimator objective, and a beam splitter prism. The light source is configured to emit light to an eye side. The light from the light source is deflected by the reflector to the collimator objective, then converted into parallel light through the collimator objective, and finally deflected by the beam splitter prism to enter a human eye. Since the light from the light source faces to the eye side, a bright dot of the light source basically cannot be observed from an object side, thereby lowering an exposure risk of a shooter.

However, when the dot sight aims at a close target, light of the target is divergent light with a certain divergence angle, rather than parallel light. In order to view the target clearly, the human eye automatically adjusts a crystalline lens to image the target on a retina. Since the light from the light source is converted into the parallel light by the collimator objective, and a shape of the crystalline lens in the human eye is changed, the light from the light source is imaged in front of the retina. Consequently, an image of the light from the light source and an image of the target are not superimposed on the retina to cause a parallax. Specifically, when a head shakes, an imaging position of the light from the light source and an imaging position of the target are relatively changed, which affects aiming accuracy.

SUMMARY

An embodiment of the present application is intended to provide a dot sight, to solve the problem that when aiming at a close target, the existing dot sight has a parallax to affect an aiming accuracy.

To achieve the above objective, the present application uses the following technical solutions: A dot sight includes:

- a sight mount, where a first chamber extending along an axial direction of the sight mount is formed in the sight mount, and an end of the first chamber close to an object side communicates with the outside;
- a sight frame provided at a circumferential side of the sight mount close to an eye side, where a second chamber penetrating through the sight frame along an axial direction, and a through opening communicating the second chamber and the first chamber are formed in the sight frame;
- a light source member provided at the end of the first chamber close to the object side, and configured to emit light to the eye side, and an axial position of the light source member relative to the sight mount is adjustable;
- a collimator lens set provided in the first chamber, and provided at a side of the light source member close to the eye side;
- a reflector provided in the first chamber, and corresponding to the through opening; and
- a beam splitter prism provided in the second chamber, where the beam splitter prism includes a first prism and a second prism cemented to each other, and a reflective film is provided on a cemented plane of the first prism and the second prism.

In an embodiment, the light source member is threadedly connected to the sight mount.

In an embodiment, the dot sight further includes an inner tube provided at the end of the first chamber close to the object side, and a first adjustment mechanism provided at an end of the inner tube close to the eye side; a first ball head is provided convexly at a circumferential side of the inner tube; a first ball socket is provided concavely on a wall of the first chamber; the first ball head is hinged to the first ball socket; the first adjustment mechanism is configured to drive the inner tube to rotate; a third chamber penetrating through the inner tube along an axial direction is formed in the inner tube; the light source member is provided in the third chamber; and an axial position of the light source member relative to the inner tube is adjustable.

In an embodiment, the light source member is threadedly connected to the inner tube.

In an embodiment, the dot sight further includes a first spring; the first spring is provided in the third chamber; and two axially opposite ends of the first spring are respectively connected to the light source member and the inner tube.

In an embodiment, the third chamber includes a first mounting hole and a first through hole sequentially arranged from the object side to the eye side; and

- the dot sight further includes a first adjusting rod and a first pressure ring; the first adjusting rod is rotatably provided in the first mounting hole; the first pressure ring is connected to an end of the inner tube close to the object side, and restricts the first adjusting rod from moving axially along the first mounting hole; an end of the first adjusting rod close to the eye side is provided with an axially extending first connecting hole; the light source member includes one end connected to the first connecting hole, and the other end penetrating through the first through hole; and the first adjusting rod in rotation can drive the light source member to move axially relative to the first through hole.

In an embodiment, an end of the light source member is threadedly connected to the first connecting hole; and the first through hole is a non-circular hole, and restricts the light source member from rotating relative to the first through hole; or

- the end of the light source member is inserted into the first connecting hole; the first connecting hole is a non-circular hole, and restricts the light source member from rotating relative to the first connecting hole; and the light source member is threadedly connected to the first through hole.

In an embodiment, the dot sight further includes a second spring; the second spring is provided in the first connecting hole; and two axially opposite ends of the second spring are respectively connected to the light source member and the first adjusting rod, or the two axially opposite ends of the second spring are respectively connected to the light source member and the inner tube.

In an embodiment, the end of the first chamber close to the object side is sequentially provided with a second mounting hole and a second through hole from the object side to the eye side; and the dot sight further includes a second adjusting rod and a second pressure ring; the second adjusting rod is rotatably provided in the second mounting hole; the second pressure ring is connected to an end of the sight mount close to the object side, and restricts the second adjusting rod from moving axially along the second mounting hole; an end of the second adjusting rod close to the eye side is provided with an axially extending second connecting hole; the light source member includes one end connected to the second connecting hole, and the other end penetrating through the second through hole; and the second adjusting rod in rotation can drive the light source member to move axially relative to the second through hole.

In an embodiment, the end of the light source member is threadedly connected to the second connecting hole; and the second through hole is a non-circular hole, and restricts the light source member from rotating relative to the second through hole; or the end of the light source member is inserted into the second connecting hole; the second connecting hole is a non-circular hole, and restricts the light source member from rotating relative to the second connecting hole; and the light source member is threadedly connected to the second through hole.

In an embodiment, the dot sight further includes a third spring; the third spring is provided in the second connecting hole; and two axially opposite ends of the third spring are respectively connected to the light source member and the second adjusting rod, or the two axially opposite ends of the third spring are respectively connected to the light source member and the sight mount.

In an embodiment, the collimator lens set includes a first lens, a second lens, and a third lens sequentially arranged from the object side to the eye side and having a refractive capability;

the first lens and the second lens are provided between the light source member and the reflector; and the third lens is provided at the through opening; or the first lens, the second lens, and the third lens are provided between the light source member and the reflector.

In an embodiment, the dot sight further includes a battery and/or a solar panel electrically connected to the light source member and configured to supply power to the light source member.

An embodiment of the present application is further intended to provide a dot sight, including:

a sight mount, where a first chamber extending along an axial direction of the sight mount is formed in the sight mount;

a sight frame provided at a circumferential side of the sight mount close to an eye side, where a second chamber penetrating through the sight frame along an axial direction, and a through opening communicating the second chamber and the first chamber are formed in the sight frame;

a light source member provided at an end of the first chamber close to an object side, and configured to emit light to the eye side;

a reflector provided in the first chamber, and corresponding to the through opening;

a beam splitter prism provided in the second chamber, where the beam splitter prism includes a first prism and a second prism cemented to each other, and a reflective film is provided on a cemented plane of the first prism and the second prism; and a collimator lens set provided in the first chamber, where the collimator lens set includes a first lens, a second lens, and a third lens sequentially arranged and having a refractive capability; the first lens and the second lens are provided between the light source member and the reflector; the third lens is provided between the second lens and the beam splitter prism; the first lens and the third lens are fixed relative to the sight mount; and an axial position of the second lens relative to the sight mount is adjustable.

In an embodiment, the collimator lens set further includes a first lens holder for mounting the first lens, and a second lens holder for mounting the second lens; the first lens holder is fixedly provided in the first chamber; and the second lens holder is slidably provided in the first chamber.

In an embodiment, a third mounting hole is formed in a circumferential surface of the sight mount; a third through hole communicated with the first chamber is formed in a bottom of the third mounting hole; and the third through hole is a waist-shaped hole extending along the axial direction of the sight mount; and the dot sight further includes a focusing mechanism; the focusing mechanism includes a focusing handwheel and a deflector rod; the focusing handwheel is rotatably provided in the third mounting hole, and is restricted from moving axially along the third mounting hole; an end of the focusing handwheel close to the bottom of the third mounting hole is provided with a curved groove; the curved groove extends along a circumferential direction of the focusing handwheel; a centerline of the curved groove is gradually close to a central axis of the focusing handwheel; the deflector rod includes one end slidably connected to the curved groove, and the other end penetrating through the third through hole and connected to the second lens holder; and the focusing handwheel in rotation can drive the second lens holder to slide in the first chamber.

In an embodiment, a third connecting hole is formed in the bottom of the third mounting hole; and the focusing mechanism further includes a locking bolt; a nail portion of the locking bolt is provided on the focusing handwheel in a penetration manner and threadedly connected to the third connecting hole; and a head portion of the locking bolt presses the focusing handwheel and restricts the focusing handwheel from moving axially along the third mounting hole.

In an embodiment, the dot sight further includes a fourth spring elastically pressed between the first lens holder and the second lens holder.

In an embodiment, a second ball head is provided convexly at a circumferential side of the light source member; a second ball socket is provided concavely on a wall of the first chamber; the second ball head is hinged to the second ball socket; the dot sight further includes a second adjustment mechanism provided at an end of the light source member close to the eye side; and the second adjustment mechanism is configured to drive the light source member to rotate.

The dot sight provided by the present application has the following beneficial effects: According to the dot sight provided by the embodiment of the present application, the light source member, the collimator lens set, and the reflector are provided in the sight mount. The beam splitter prism is provided in the sight frame. The light source member emits the light to the collimator lens set. The light from the light source member is refracted by the collimator lens set. The light from the light source member is reflected repeatedly to the eye side through the reflector, and the reflective film on the first prism and the second prism. This can effectively ensure invisibility of the light source member and the light from the light source member, basically cannot observe a bright dot of a target from the object side, and can effectively lower an exposure risk of a shooter.

Upon this, according to the dot sight provided by the embodiment of the present application, in response to different aiming distances, by adjusting the axial position of the light source member relative to the sight mount to adjust a distance from the light source member to the collimator lens set, or by adjusting the axial position of the second lens of the collimator lens set relative to the sight mount to adjust a distance from the second lens of the collimator lens set to the light source member, a refraction effect of the collimator lens set for the light from the light source member can further be adjusted. Consequently, the light from the light source member and the light of the target have an approximately same incident angle when entering the eye side, and the light from the light source member and the light of the target can be superimposed on a retina for imaging. This can effectively eliminate a parallax, can effectively make the parallax fall within an allowed range at different aiming distances, and can effectively ensure and improve an aiming accuracy.

BRIEF DESCRIPTION OF THE DRAWINGS

To describe the technical solutions in the embodiments of the present application more clearly, the drawings required for describing the embodiments or the prior art are described briefly below. Apparently, the drawings in the following description merely show some embodiments of the present application, and those of ordinary skill in the art may still derive other drawings from these drawings without creative efforts.

In the figures.

Figure 1:
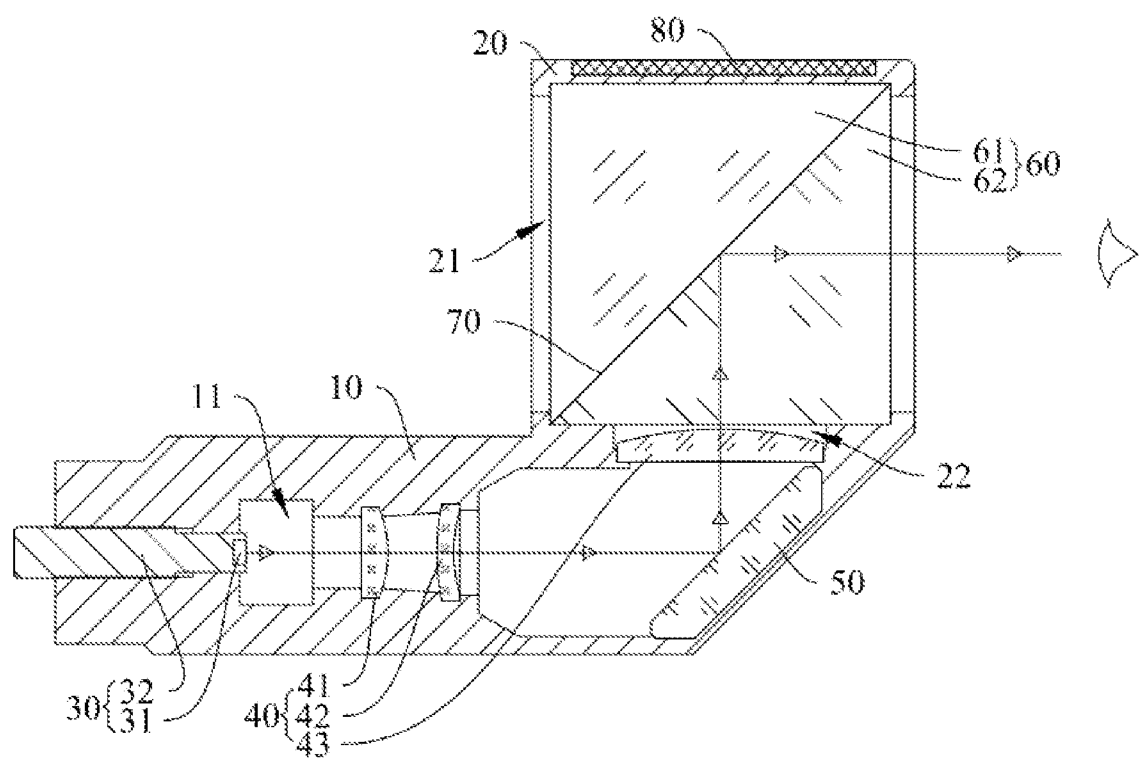
FIG. 1 is a first structural schematic view of a dot sight according to Embodiment 1 of the present application.

10—sight mount, 11—first chamber, 20—sight frame, 21—second chamber, 22—through opening, 30—light source member, 31—light-emitting element, 32—lamp holder, 40—collimator lens set, 41—first lens, 42—second lens, 43—third lens, 50—reflector, 60—beam splitter prism, 61—first prism, 62—second prism, 70—reflective film, 80—solar panel, 111—first ball socket, 90—inner tube, 91—first ball head, 92—third chamber, 100—first adjustment mechanism, 101—first ballistic adjusting bolt, 102—first windage adjusting bolt, 110—first spring, 921—first mounting hole, 922—first through hole, 120—first adjusting rod, 121—first connecting hole, 130—first pressure ring, 140—second spring, 112—second mounting hole, 113—second through hole, 150—second adjusting rod, 151—second connecting hole, 160—second pressure ring, 170—third spring, 180—first lens holder, 190—second lens holder, 12—third mounting hole, 13—third through hole, 14—third connecting hole, 200—focusing mechanism, 201—focusing handwheel, 2011—curved groove, 202—deflector rod, 203—locking bolt, 210—fourth spring, 33—second ball head, 114—second ball socket, 220—second adjustment mechanism, 221—second ballistic adjusting bolt, and 222—second windage adjusting bolt.

DETAILED DESCRIPTION OF THE EMBODIMENTS

To make the to-be-resolved technical problems, technical solutions and beneficial effects of the present application clearer, the present application is described in further detail below with reference to the drawings and embodiments. It should be understood that the specific embodiments described herein are merely intended to explain the present application, rather than to limit the present application.

In the description of the present application, it needs to be understood the orientation or positional relationships indicated by terms, such as “length”, “width”, “upper”, “lower”, “front”, “rear”, “left”, “right”, “vertical”, “horizontal”, “top”, “bottom”, “inside”, and “outside”, are based on the orientation or positional relationship shown in the accompanying drawings, are merely for facilitating the description of the present application and simplifying the description, rather than indicating or implying that an apparatus or element referred to must have a particular orientation or be constructed and operated in a particular orientation, and therefore shall not be interpreted as limiting the present application.

In addition, the terms “first” and “second” are merely intended for a purpose of description, and shall not be understood as an indication or implication of relative importance or implicit indication of a quantity of indicated technical features. Thus, features defined with “first” and “second” may explicitly or implicitly include one or more of the features. In the description of the present application, “multiple” means two or more, unless otherwise specifically defined.

In the present application, unless otherwise clearly specified, the terms such as “mounting”, “interconnection”, “connection” and “fixation” are intended to be understood in a broad sense. For example, the “connection” may be a fixed connection, removable connection or integral connection; may be a mechanical connection or electrical connection; may be a direct connection or indirect connection via a medium; and may be a communication or interaction between two elements. Those of ordinary skill in the art may understand specific meanings of the above terms in the present application based on specific situations.

A sight is usually provided on a firearm to make aiming more accurate and shooting less difficult. In the present application, the term "eye side" refers to an end of the sight close to a shooter in an actual operation, and the term "object side" refers to an end of the sight close to a target in the actual operation, namely an end away from the shooter.

An existing dot sight usually includes a light source, a reflector, a collimator objective, and a beam splitter prism. The light source is configured to emit light to the eye side. The light from the light source is deflected by the reflector to the collimator objective, then converted into parallel light through the collimator objective, and finally deflected by the beam splitter prism to enter a human eye. Since the light from the light source faces to the eye side, a bright dot of the light source basically cannot be observed from the object side, thereby lowering an exposure risk of the shooter.

However, when the dot sight aims at a close target, light of the target is divergent light with a certain divergence angle, rather than parallel light. In order to view the target clearly, the human eye automatically adjusts a crystalline lens to image the target on a retina. Since the light from the light source is converted into the parallel light by the collimator objective, and a shape of the crystalline lens in the human eye is changed, the light from the light source is imaged in front of the retina. Consequently, an image of the light from the light source and an image of the target are not superimposed on the retina to cause a parallax. Specifically, when a head shakes, an imaging position of the light from the light source and an imaging position of the target are changed relatively to affect an aiming accuracy.

Therefore, an embodiment of the present application provides a novel dot sight. While hiding a bright dot of a light source to lower an exposure risk of a shooter, the dot sight can make a parallax fall within an allowed range at different aiming distances, thereby ensuring and improving an aiming accuracy.

The specific implementation of the present application is described in detail below with reference to specific embodiments.

Embodiment 1

Figure 3:
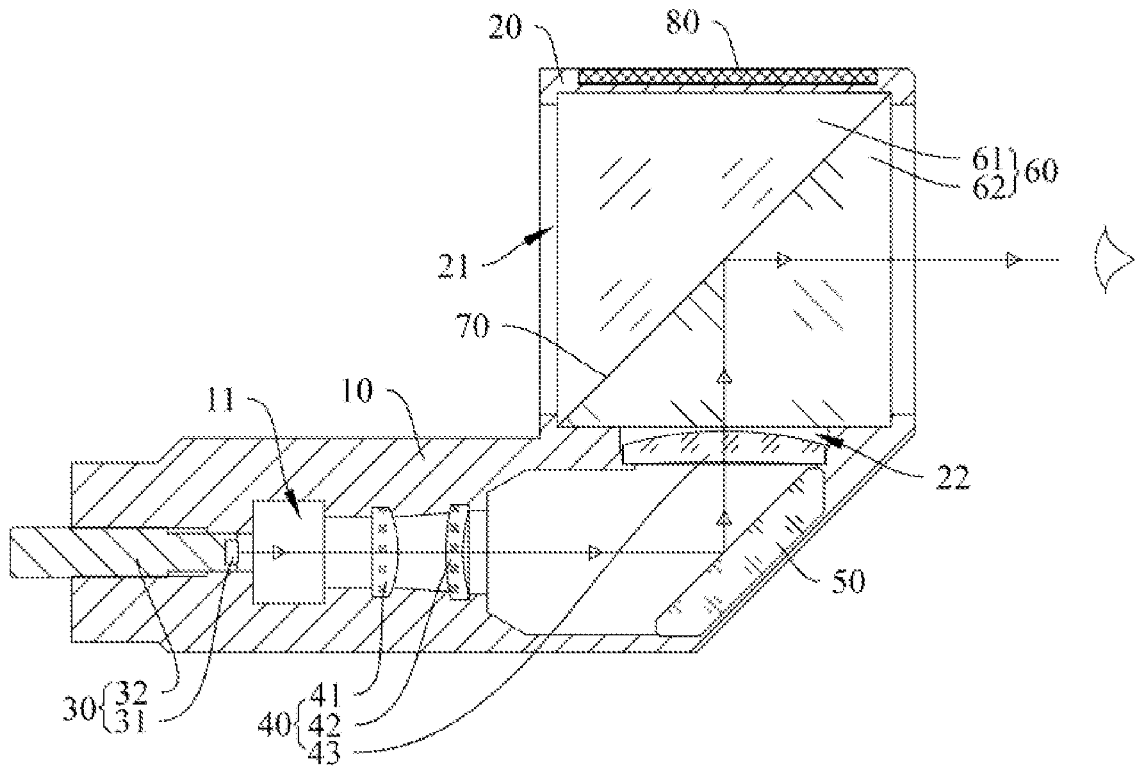
FIG. 3 is a second structural schematic view of the dot sight in FIG. 1.

Referring to FIG. 1 and FIG. 3, an embodiment of the present application provides a dot sight, including sight mount 10, sight frame 20, light source member 30, collimator lens set 40, reflector 50, and beam splitter prism 60. First chamber 11 extending along an axial direction of the sight mount is formed in the sight mount 10. An end of the first chamber 11 close to an object side communicates with the outside. The sight frame 20 is provided at a circumferential side of the sight mount 10 close to an eye side. Second chamber 21 penetrating through the sight frame along an axial direction, and through opening 22 communicating the second chamber 21 and the first chamber 11 are formed in the sight frame 20. The light source member 30 is provided at the end of the first chamber 11 close to the object side, and configured to emit light to the eye side. An axial position of the light source member 30 relative to the sight mount 10 is adjustable. The collimator lens set 40 is provided in the first chamber 11, and provided at a side of the light source member 30 close to the eye side. The reflector 50 is provided in the first chamber 11, and corresponding to the through opening 22. The beam splitter prism 60 is provided in the second chamber 21. The beam splitter prism 60 includes first prism 61 and second prism 62 cemented to each other. Reflective film 70 is provided on a cemented plane of the first prism 61 and the second prism 62.

It is to be noted that the light source member 30, the collimator lens set 40, and the reflector 50 are accommodated in the first chamber 11 of the sight mount 10. The sight mount 10 can protect the light source member 30, the collimator lens set 40, and the reflector 50 in the first chamber 11 reliably.

The light source member 30 is provided at the end of the first chamber 11 close to the object side, and configured to emit the light to the collimator lens set 40. Since the light from the light source member 30 faces to the eye side, a bright dot of a target basically cannot be observed from the object side, thereby lowering an exposure risk of a shooter. The light source member 30 can be stressed to move back and forth along the axial direction of the sight mount 10, thereby adjusting a distance from the light source member to the collimator lens set 40. The light source member 30 includes light-emitting element 31 for emitting light to the collimator lens set 40, and lamp holder 32 for supporting and fixing the light-emitting element 31. An optical axis of the light-emitting element 31 is aligned at an optical axis of the collimator lens set 40. The light-emitting element 31 may be, but is not limited to, a light-emitting diode (LED) lamp.

The collimator lens set 40 is provided in a space of the first chamber 11 from the light source member 30 to the through opening 22. The collimator lens set 40 is configured to refract the light from the light source member 30. Specifically, when the distance from the light source member 30 to the collimator lens set 40 is an adjusted distance, the light from the light source member 30 can be refracted into approximately parallel light by the collimator lens set 40. Based on the adjusted distance, the light source member 30 is driven to move close to or away from the collimator lens set 40, thereby adjusting the distance from the light source member 30 to the collimator lens set 40, namely changing a refraction effect of the collimator lens set 40 for the light from the light source member 30. For example, the light from the light source member 30 is refracted into divergent light by the collimator lens set 40.

The reflector 50 corresponds to the through opening 22. The reflector 50 inclines to a central axis of the first chamber 11 and a central axis of the through opening 22. Without a refractive capability, the reflector 50 is mainly configured to reflect and deflect light propagated along the first chamber 11 to the beam splitter prism 60 through the through opening 22.

It is further to be noted that the beam splitter prism 60 is limited and accommodated in the second chamber 21 of the sight frame 20. The sight frame 20 can protect the beam splitter prism 60 in the second chamber 21 reliably.

The beam splitter prism 60 includes the first prism 61 and the second prism 62 cemented to each other. The cemented plane of the first prism 61 and the second prism 62 inclines to a central axis of the second chamber 21 and the central axis of the through opening 22. The reflective film 70 is provided on the cemented plane of the first prism 61 and the second prism 62. The reflective film 70 is configured to reflect light of a specific wavelength and allow light of other wavelengths to penetrate through. Specifically, the reflective film 70 is configured to further reflect light reflected by the reflector 50 to the eye side, and allow target light from an end of the second chamber 21 close to the object side to penetrate through and transmit to the eye side. The reflective film 70 may be provided on the cemented plane of the first prism 61 or the cemented plane of the second prism 62 in a manner including but not limited to coating.

Figure 2:
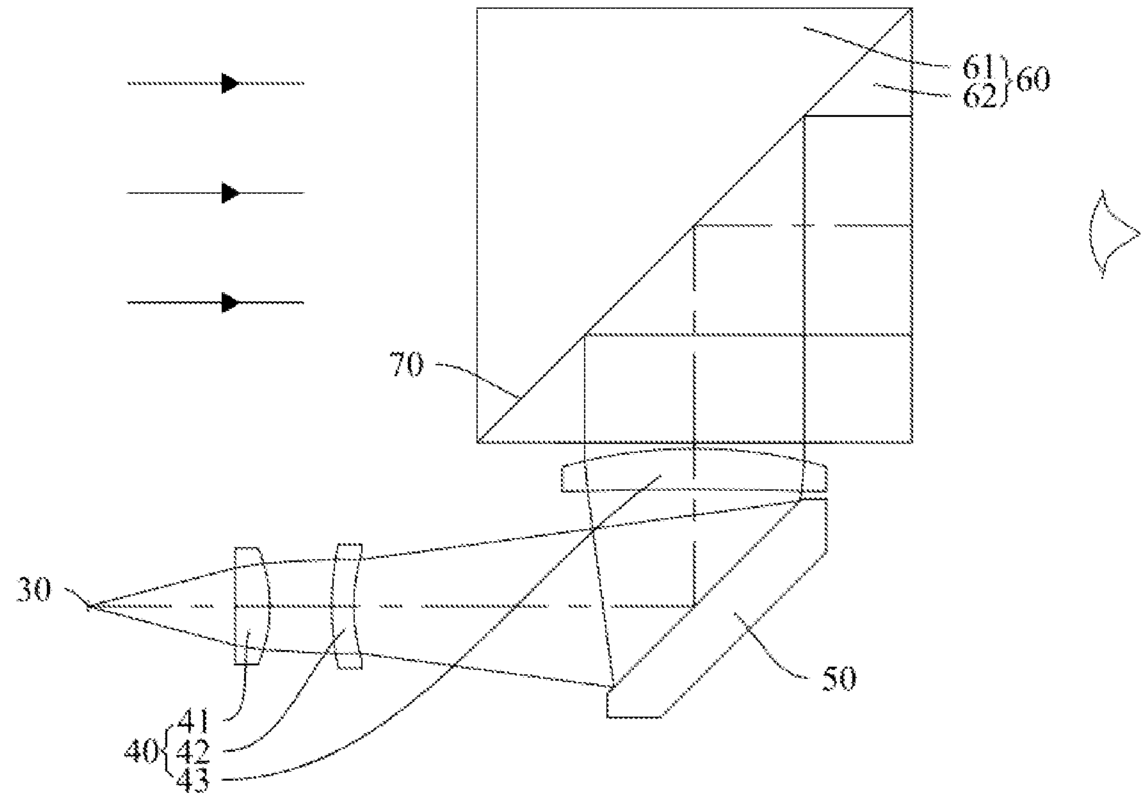
FIG. 2 is a schematic view illustrating a principle when the dot sight in FIG. 1 aims at a distant target.

To sum up, the dot sight provided by the embodiment of the present application basically has the following working principle: The dot sight is adjusted in advance according to a distant target when leaving a factory. As shown in FIG. 1 and FIG. 2, when the dot sight aims at the distant target, light of the distant target enters the eye side through the second chamber 21 and the reflective film 70 as approximately parallel light. In this case, the axial position of the light source member 30 relative to the sight mount 10 can keep unchanged to maintain the adjusted distance between the light source member 30 and the collimator lens set 40. The light from the light source member 30 can be refracted into the approximately parallel light by the collimator lens set 40, reflected to the beam splitter prism 60 by the reflector 50, and reflected to the eye side through the reflective film 70 on the cemented plane of the first prism 61 and the second prism 62 of the beam splitter prism 60. For the sake of clear viewing on the target, a human eye automatically adjusts a crystalline lens to image the target on a retina. Since the light from the light source member 30 and the light of the distant target are approximately parallel when entering the eye side, the light from the light source member 30 and the light of the distant target can be superimposed on the retina for imaging. This can effectively eliminate a parallax, and can effectively ensure and improve an aiming accuracy.

Figure 4:
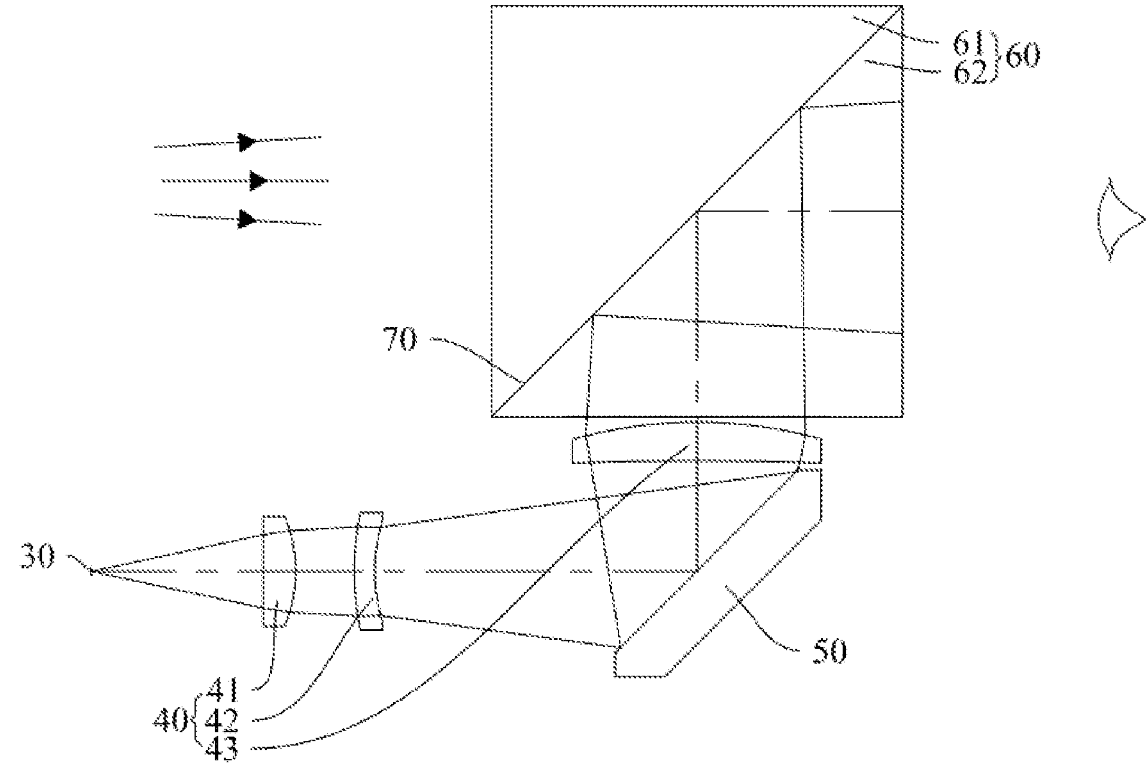
FIG. 4 is a schematic view illustrating a principle when the dot sight in FIG. 3 aims at a close target.

On the contrary, as shown in FIG. 3 and FIG. 4, when the dot sight aims at a close target, light of the close target enters the eye side through the second chamber 21 and the reflective film 70 as divergent light with a certain divergence angle. In this case, the light source member 30 can be driven to move away from or close to the collimator lens set 40 relative to the sight mount 10 to adjust the distance from the light source member 30 to the collimator lens set 40, and adjust a refraction effect of the collimator lens set 40 for the light from the light source member 30, until "the light from the light source member 30 can be refracted into divergent light by the collimator lens set 40, and when this light is reflected repeatedly to the eye side by the reflector 50 and the reflective film 70 of the beam splitter prism 60, an incident angle of this light is approximately the same as an angle of the light of the close target for entering the eye side". For the sake of clear viewing on the target, the human eye automatically adjusts the crystalline lens to image the target on the retina. Since the light from the light source member 30 and the light of the close target are the divergent light when entering the eye side, and enter the human eye at the approximately same angle, the light from the light source member 30 and the light of the close target can be superimposed on the retina for imaging. This can effectively eliminate a parallax, and can effectively ensure and improve an aiming accuracy.

Therefore, according to the dot sight provided by the embodiment of the present application, the light source member 30, the collimator lens set 40, and the reflector 50 are provided in the sight mount 10. The beam splitter prism 60 is provided in the sight frame 20. The light source member 30 emits the light to the collimator lens set 40. The light from the light source member 30 is refracted by the collimator lens set 40. The light from the light source member 30 is reflected repeatedly to the eye side through the reflector 50, and the reflective film 70 on the first prism 61 and the second prism 62. This can effectively ensure invisibility of the light source member 30 and the light from the light source member, basically cannot observe a bright dot of the target from the object side, and can effectively lower an exposure risk of the shooter. Upon this, according to the dot sight provided by the embodiment of the present application, in response to different aiming distances, by adjusting the axial position of the light source member 30 relative to the sight mount 10 to adjust a distance from the light source member 30 to the collimator lens set 40, a refraction effect of the collimator lens set 40 for the light from the light source member 30 can further be adjusted. Consequently, the light from the light source member 30 and the light of the target have an approximately same incident angle when entering the eye side, and the light from the light source member 30 and the light of the target can be superimposed on the retina for imaging. This can effectively eliminate a parallax, can effectively make the parallax fall within an allowed range at different aiming distances, and can effectively ensure and improve the aiming accuracy. Therefore, the dot sight provided by the embodiment of the present application can be applied to an occasion with various aiming distances, and has a wide application range.

In addition, when the existing dot sight aims at the close target, an image at an aiming dot of the dot sight and an image of the target are not superimposed on the retina. In order to clearly view either of the images, the human eye adjusts the crystalline lens continuously. As a result, the eye is easily fatigued, and the dot sight has a poor aiming comfort. In view of this, according to the dot sight provided by the embodiment of the present application, in response to different aiming distances, the axial position of the light source member 30 relative to the sight mount 10 can be adjusted, the light from the light source member 30 and the light of the target can be superimposed on the retina for imaging, and the human eye can automatically adjust the crystalline lens and clearly view the image at the aiming point of the dot sight and the image of the target. This can effectively ensure and improve an aiming comfort of the dot sight, and can effectively reduce fatigue of the eye.

Moreover, the existing dot sight generates different and large parallaxes for different aiming distances. When a side of the existing dot sight close to the eye side is provided with a convertible lens, as long as shaking a head slightly to view the convertible lens, the shooter can obviously view that the aiming point of the dot sight moves quickly, is not aligned at the target, and does not have a fixed relative position in an amplified field of view (FOV). As a result, the shooter is hard to aim at the target. In view of this, in response to different aiming distances, since the axial position of the light source member 30 relative to the sight mount 10 can be adjusted, the dot sight provided by the embodiment of the present application can eliminate the parallax, and can make the parallax fall within the allowed range at the different aiming distances. When a side of the dot sight close to the eye side is provided with a convertible lens, even though shaking a head to view the convertible lens, the shooter can view the aiming point of the dot sight and the target that are amplified by a certain ratio, are aligned and have fixed relative positions in an amplified FOV. This can effectively ensure and improve the aiming accuracy and the aiming comfort of the shooter. Therefore, the dot sight provided by the embodiment of the present application is particularly used in cooperation with the convertible lens, with more prominent advantages.

Referring to FIG. 1 and FIG. 3, in the embodiment, the light source member 30 is threadedly connected to the sight mount 10. Specifically, an inner wall of the first chamber 11 of the sight mount 10 is provided with an internal thread. An outer side of the lamp holder 32 of the light source member 30 is provided with an external thread. The lamp holder 32 of the light source member 30 is threadedly connected to the sight mount 10.

With the above solution, by threadedly connecting the light source member 30 to the sight mount 10, the light source member 30 and the sight mount 10 are assembled conveniently and quickly. Furthermore, by rotating the light source member 30 in use, the axial position of the light source member 30 relative to the sight mount 10 can be adjusted. This is convenient and quick, and facilitates stabilization and fixation of the adjusted axial position of the light source member 30 relative to the sight mount 10.

Referring to FIG. 1 and FIG. 3, in the embodiment, the collimator lens set 40 includes first lens 41, second lens 42, and third lens 43 sequentially arranged from the object side to the eye side and having a refractive capability. The first lens 41 and the second lens 42 are provided between the light source member 30 and the reflector 50. The third lens 43 is provided at the through opening 22.

Based on the embodiment, when the light source member 30 emits the light to the collimator lens set 40, the light passes through the first lens 41, and is refracted firstly by the first lens 41. The light passes through the second lens 42, and is refracted secondly by the second lens 42. Then, the light reaches the reflector 50 and is reflected to the through opening 22 by the reflector 50. The light passes through the third lens 43 at the through opening 22, and is refracted thirdly by the third lens 43. So far, the collimator lens set 40 refracts the light from the light source member 30 completely. As shown in FIG. 2 and FIG. 4, by adjusting a distance from the light source member 30 to the first lens 41, the refraction effect of the collimator lens set 40 for the light from the light source member 30 can be changed.

Compared with Embodiment 9, the embodiment can relatively shorten a length of the dot sight.

Certainly, in other possible implementations, the collimator lens set 40 may refract the light from the light source member 30 with other structural solutions. For example, the collimator lens set 40 may include a collimator objective cemented lens, and is not limited thereto in the embodiment.

Referring to FIG. 1 and FIG. 3, in the embodiment, the dot sight further includes a battery (not shown in the figure) and/or solar panel 80 electrically connected to the light source member 30 and configured to supply power to the light source member 30.

The solar panel 80 is preferably provided on a top surface of the sight frame 20 or the sight mount 10. This can make the solar panel 80 receive solar light to a greater degree, and can improve power storage performance and power supply performance of the solar panel 80.

The battery is optionally provided in the sight mount 10.

When the dot sight is provided with the solar panel 80 and the battery at the same time, the dot sight can determine/switch the solar panel 80 or the battery through a control plate to supply the power to the light source member.

Embodiment 2

Figure 5:
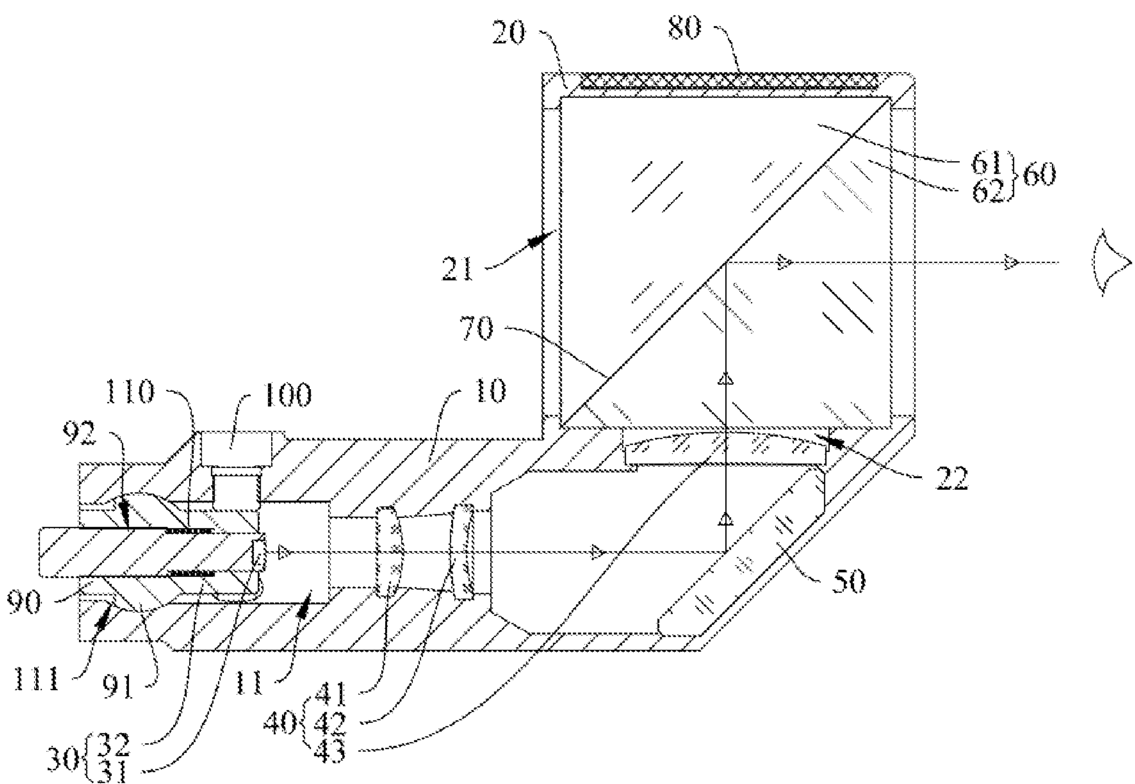
FIG. 5 is a structural schematic view of a dot sight according to Embodiment 2 of the present application.

The embodiment differs from Embodiment 1 in:

Referring to FIG. 5, in the embodiment, the dot sight further includes inner tube 90 provided at the end of the first chamber 11 close to the object side, and first adjustment mechanism 100 provided at an end of the inner tube 90 close to the eye side. First ball head 91 is provided convexly at a circumferential side of the inner tube 90. First ball socket 111 is provided concavely on a wall of the first chamber 11. The first ball head 91 is hinged to the first ball socket 111. The first adjustment mechanism 100 is configured to drive the inner tube 90 to rotate. Third chamber 92 penetrating through the inner tube along an axial direction is formed in the inner tube 90. The light source member 30 is provided in the third chamber 92. An axial position of the light source member 30 relative to the inner tube 90 is adjustable.

It is to be noted that the inner tube 90 is provided in the first chamber 11. The first ball head 91 of the inner tube 90 is hinged to the first ball socket 111 and cannot be separated from the first ball socket 111. When an end of the inner tube 90 is stressed, the inner tube 90 can rotate stably and reliably around the first ball head 91 for a certain amplitude.

Figure 7:
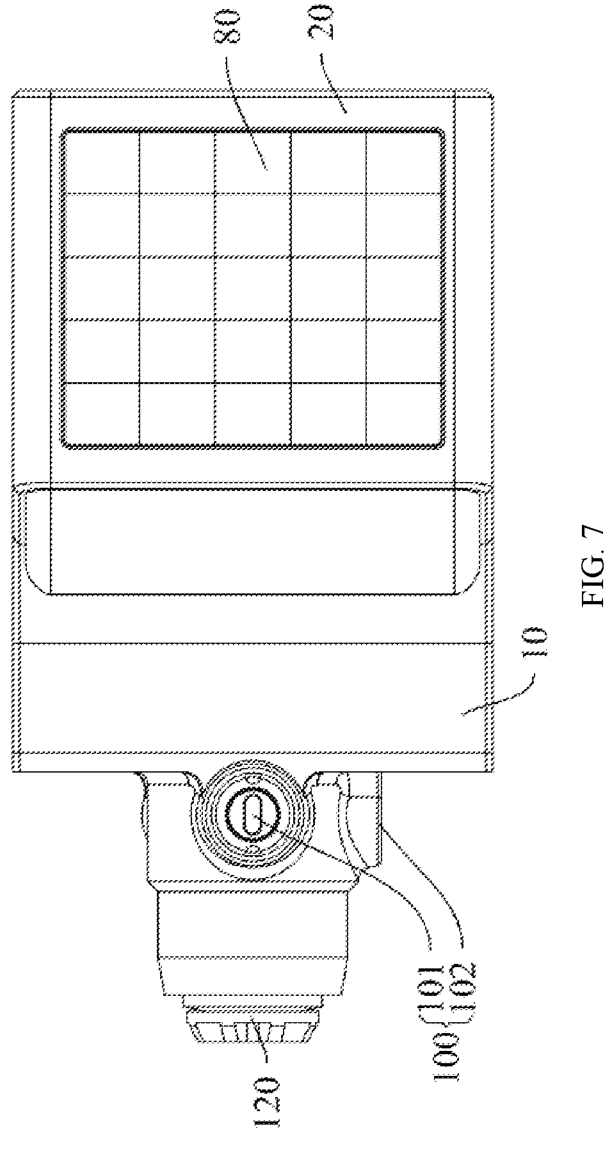
FIG. 7 is a top view of the dot sight in FIG. 6.

Penetrating through the sight mount 10 and provided at the end of the inner tube 90 close to the eye side, the first adjustment mechanism 100 may be configured to apply an acting force to the end of the inner tube 90 close to the eye side, so as to drive the inner tube 90 to rotate around the first ball head 91 for a controllable amplitude. Therefore, the optical axis of the light source member 30 in the third chamber 92 of the inner tube 90 is aligned at the optical axis of the collimator lens set 40 conveniently and controllably. This can effectively eliminate an assembly error, can effectively ensure and improve an accuracy of a position for the aiming point of the dot sight, and can effectively ensure and improve the aiming accuracy. Referring to FIG. 7, the first adjustment mechanism 100 includes first ballistic adjusting bolt 101 and first windage adjusting bolt 102. Provided at a side of the inner tube 90 along a vertical direction, the first ballistic adjusting bolt 101 may be configured to apply a vertical acting force to the end of the inner tube 90 close to the eye side, so as to realize displacement adjustment of the inner tube 90, the light source member 30 and particularly the optical axis of the light source member 30 in the vertical direction. Provided at a side of the inner tube 90 along a horizontal direction, the first windage adjusting bolt 102 may be configured to apply a horizontal acting force to the end of the inner tube 90 close to the eye side, so as to realize displacement adjustment of the inner tube 90, the light source member 30 and particularly the optical axis of the light source member 30 in the horizontal direction. Through the first adjustment mechanism 100, the optical axis of the light source member 30 can be aligned at the optical axis of the collimator lens set 40 quickly and conveniently.

The light source member 30 is provided in the third chamber 92 of the inner tube 90. The axial position of the light source member 30 relative to the inner tube 90 is adjustable. Upon this, by adjusting the axial position of the light source member 30 relative to the inner tube 90, the axial position of the light source member 30 relative to the sight mount 10 can be adjusted, so as to adjust the distance from the light source member 30 to the collimator lens set 40, and adjust the refraction effect of the collimator lens set 40 for the light from the light source member 30. Consequently, the light from the light source member 30 and the light of the target can be superimposed on the retina for imaging. This can effectively eliminate a parallax, can effectively make the parallax fall within an allowed range at different aiming distances, and can effectively ensure and improve the aiming accuracy.

Referring to FIG. 5, in the embodiment, the light source member 30 is threadedly connected to the inner tube 90. Specifically, an inner wall of the third chamber 92 of the inner tube 90 is provided with an internal thread. The outer side of the lamp holder 32 of the light source member 30 is provided with the external thread. The lamp holder 32 of the light source member 30 is threadedly connected to the inner tube 90.

With the above solution, by threadedly connecting the light source member 30 to the inner tube 90, the light source member 30 and the inner tube 90 are assembled conveniently and quickly. Furthermore, by rotating the light source member 30 in use, the axial position of the light source member 30 relative to the inner tube 90 can be adjusted. This is convenient and quick, and facilitates stabilization and fixation of the adjusted axial position of the light source member 30 relative to the inner tube 90.

Since the threaded fit belongs to clearance fit, there is a small clearance between the internal thread of the third chamber 92 of the inner tube 90 and the external thread of the lamp holder 32 of the light source member 30. Therefore, during adjustment, it is necessary to idle the light source member 30 to complement the clearance, and then rotate the light source member 30 in order to adjust the axial position of the light source member 30 relative to the inner tube 90. However, the clearance and the idling action have an impact on an adjustment accuracy.

Referring to FIG. 5, in the embodiment, the dot sight further includes first spring 110. The first spring 110 is provided in the third chamber 92. Two axially opposite ends of the first spring 110 are respectively connected to the light source member 30 and the inner tube 90. With the above solution, the two axially opposite ends of the first spring 110 respectively elastically abut against the light source member 30 and the inner tube 90. Through an elastic abutting force of the first spring 110 for the light source member 30, a tooth of the external thread of the light source 30 tightly abuts against a tooth of the internal thread of the inner tube 90. This can effectively eliminate the clearance between the external thread of the light source member 30 and the internal thread of the inner tube 90, can effectively ensure and improve an adjustment accuracy for the axial position of the light source member 30, and can effectively ensure and improve an accuracy of the dot sight in use.

In addition, when cooperation between the external thread of the light source 30 and the internal thread of the inner tube 90 is loose for a large thread machining error, looseness between the external thread of the light source member 30 and the internal thread of the inner tube 90 can also be effectively alleviated or even prevented based on the embodiment, thereby effectively ensuring and improving the adjustment accuracy for the axial position of the light source member 30, and effectively ensuring and improving the accuracy of the dot sight in use.

Embodiment 3

Figure 6:
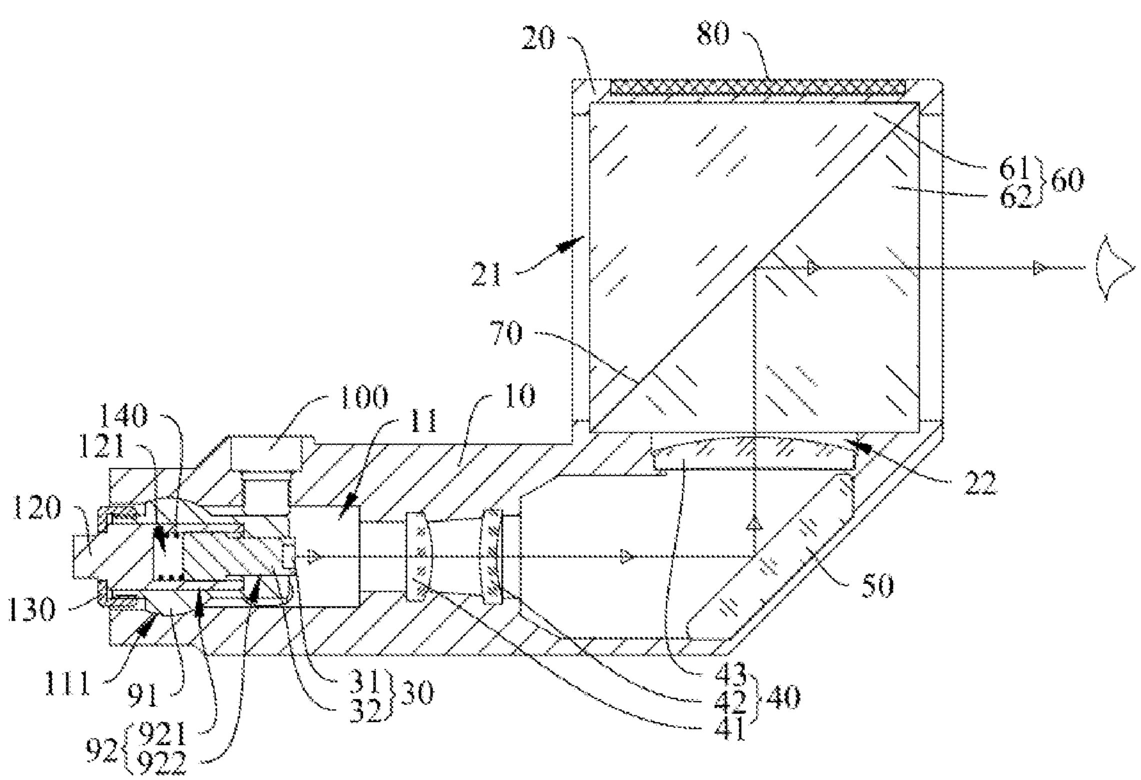
FIG. 6 is a structural schematic view of a dot sight according to Embodiment 3 of the present application.

The embodiment differs from Embodiment 2 in:

Referring to FIG. 6 and FIG. 7, in the embodiment, the third chamber 92 includes first mounting hole 921 and first through hole 922 sequentially arranged from the object side to the eye side. In other words, the first mounting hole 921 is formed at the end of the inner tube 90 close to the object side. The first through hole 922 is formed in a bottom of the first mounting hole 921. The first mounting hole 921 and the first through hole 922 form the third chamber 92.

The dot sight further includes first adjusting rod 120 and first pressure ring 130. The first adjusting rod 120 is rotatably provided in the first mounting hole 921. The first pressure ring 130 is connected to an end of the inner tube 90 close to the object side, and restricts the first adjusting rod 120 from moving axially along the first mounting hole 921. An end of the first adjusting rod 120 close to the eye side is provided with axially extending first connecting hole 121. The light source member 30 includes one end connected to the first connecting hole 121, and the other end penetrating through the first through hole 922. The first adjusting rod 120 in rotation can drive the light source member 30 to move axially relative to the first through hole 922.

It is to be noted that the first adjusting rod 120 is provided in the first mounting hole 921, and can rotate around a central axis of the first adjusting rod 120 in the first mounting hole 921 under an external force.

The first pressure ring 130 may be connected to the end of the inner tube 90 close to the object side in a manner including but not limited to threaded connection and/or glue bonding. The first pressure ring 130 presses and abuts against the first adjusting rod 120, and limits the first adjusting rod 120 in the first mounting hole 921. The first pressure ring 130 can particularly restricts the first adjusting rod 120 from moving axially relative to the first mounting hole 921, and can particularly restrict the first adjusting rod 120 from separating from the first mounting hole 921. An end of the first adjusting rod 120 close to the object side is exposed out or protruded from an inner race of the first pressure ring 130, so as to drive the first adjusting rod 120 to rotate under an external force.

The light source member 30 includes one end connected to the first connecting hole 121 of the first adjusting rod 120, and the other end penetrating through the first through hole 922. When the first adjusting rod 120 rotates under an external force, the light source member 30 can move axially relative to the first through hole 922, thereby adjusting the axial position of the light source member 30 relative to the inner tube 90 and the sight mount 10, adjusting the distance from the light source member 30 to the collimator lens set 40, and adjusting the refraction effect of the collimator lens set 40 for the light from the light source member 30. Consequently, the light from the light source member 30 and the light of the target can be superimposed on the retina for imaging. This can effectively eliminate a parallax, can effectively make the parallax fall within an allowed range at different aiming distances, and can effectively ensure and improve an aiming accuracy.

Compared with Embodiment 2, by rotating the first adjusting rod 120, the light source member 30 is driven to move axially in the embodiment. This not only can realize adjustment on the axial position of the light source member 30, but also can keep a region (namely the end of the first adjusting rod 120 close to the object side) for the adjustment of the shooter at the axial position basically unchanged, thereby better facilitating the adjustment of the shooter.

Referring to FIG. 6, in the embodiment, an end of the light source member 30 is threadedly connected to the first connecting hole 121. The first through hole 922 is a non-circular hole, and restricts the light source member 30 from rotating relative to the first through hole 922. The first through hole 922 is the non-circular hole, and may specifically be a polygonal hole or a special-shaped hole. A cross-sectional shape of a portion of the light source member 30 penetrating through the first through hole 922 is the same as a shape of the first through hole 922.

With the above solution, when the first adjusting rod 120 rotates under an external force, since the light source member 30 cannot rotate under the restriction of the first through hole 922, the light source member 30 can move axially relative to the first through hole 922 under driving of a thread of the first connecting hole 121 of the first adjusting rod 120, thereby adjusting the axial position of the light source member 30 relative to the inner tube 90 and the sight mount 10, adjusting the distance from the light source member 30 to the collimator lens set 40, and adjusting the refraction effect of the collimator lens set 40 for the light from the light source member 30. Consequently, the light from the light source member 30 and the light of the target can be superimposed on the retina for imaging. This can effectively eliminate a parallax, can effectively make the parallax fall within an allowed range at different aiming distances, and can effectively ensure and improve an aiming accuracy.

Since the light source member 30 only moves axially relative to the first through hole 922 and does not rotate relative to the first through hole 922, the embodiment is particularly applied to the light source member 30 using a multipoint LED and/or a reticle pattern. As long as the multipoint LED and/or the reticle pattern of the light source member 30 is adjusted well in advance before the dot sight leaves the factory, the multipoint LED and/or the reticle pattern of the light source member 30 can keep an adjusted state without rotation when the axial position of the light source member 30 is adjusted, thereby better ensuring and improving the aiming accuracy. The reticle pattern may be, but is not limited to, a circle-dot reticle pattern, a reticle pattern with a horizontal line and a vertical line, etc.

Since the threaded fit belongs to clearance fit, there is a small clearance between the external thread of the light source member 30 and the corresponding internal thread. Therefore, during adjustment, it is necessary to idle for complementing the clearance, and then rotate, in order to adjust the axial position of the light source member 30 relative to the inner tube 90 and the sight mount 10. However, the clearance and the idling action have an impact on an adjustment accuracy.

Referring to FIG. 6, in the embodiment, the dot sight further includes second spring 140. The second spring 140 is provided in the first connecting hole 121. Two axially opposite ends of the second spring 140 are respectively connected to the light source member 30 and the first adjusting rod 120. With the above solution, the two axially opposite ends of the second spring 140 respectively elastically abut against the light source member 30 and the first adjusting rod 120. Through an elastic abutting force of the second spring 140 for the light source member 30, a tooth of the external thread of the light source 30 tightly abuts against a tooth of a corresponding internal thread. This can effectively eliminate the clearance between the external thread of the light source member 30 and the corresponding internal thread, can effectively ensure and improve an adjustment accuracy for the axial position of the light source member 30, and can effectively ensure and improve an accuracy of the dot sight in use.

In addition, when cooperation between the external thread of the light source 30 and the corresponding internal thread is loose for a large thread machining error, looseness between the external thread of the light source member 30 and the corresponding internal thread can also be effectively alleviated or even prevented based on the embodiment, thereby effectively ensuring and improving the adjustment accuracy for the axial position of the light source member 30, and effectively ensuring and improving the accuracy of the dot sight in use.

Embodiment 4

The embodiment differs from Embodiment 3 in:

Referring to FIG. 6, in the embodiment, the end of the light source member 30 is inserted into the first connecting hole 121. The first connecting hole 121 is a non-circular hole, and restricts the light source member 30 from rotating relative to the first connecting hole 121. The light source member 30 is threadedly connected to the first through hole 922. A cross-sectional shape of a portion of the light source member 30 inserted into the first connecting hole 121 is the same as a shape of the first connecting hole 121. The first connecting hole 121 is the non-circular hole, and may specifically be a polygonal hole or a special-shaped hole.

With the above solution, when the first adjusting rod 120 rotates under an external force, since the light source member 30 cannot deflect under the restriction of the first connecting hole 121 of the first adjusting rod 120, the light source member 30 rotates synchronously with the first adjusting rod 120. The light source member 30 can move axially relative to the first through hole 922 under driving of a thread of the first through hole 922, thereby adjusting the axial position of the light source member 30 relative to the inner tube 90 and the sight mount 10, adjusting the distance from the light source member 30 to the collimator lens set 40, and adjusting the refraction effect of the collimator lens set 40 for the light from the light source member 30. Consequently, the light from the light source member 30 and the light of the target can be superimposed on the retina for imaging. This can effectively eliminate a parallax, can effectively make the parallax fall within an allowed range at different aiming distances, and can effectively ensure and improve an aiming accuracy.

Embodiment 5

The embodiment differs from Embodiment 3 in:

Referring to FIG. 6, in the embodiment, the dot sight further includes second spring 140. The second spring 140 is provided in the first connecting hole 121. Two axially opposite ends of the second spring 140 are respectively connected to the light source member 30 and the inner tube 90.

With the above solution, the two axially opposite ends of the second spring 140 respectively elastically abut against the light source member 30 and the inner tube 90. Through an elastic abutting force of the second spring 140 for the light source member 30, a tooth of the external thread of the light source 30 tightly abuts against a tooth of a corresponding internal thread. This can effectively eliminate a clearance between the external thread of the light source member 30 and the corresponding internal thread, can effectively ensure and improve an adjustment accuracy for the axial position of the light source member 30, and can effectively ensure and improve an accuracy of the dot sight in use.

In addition, when cooperation between the external thread of the light source 30 and the corresponding internal thread is loose for a large thread machining error, looseness between the external thread of the light source member 30 and the corresponding internal thread can also be effectively alleviated or even prevented based on the embodiment, thereby effectively ensuring and improving the adjustment accuracy for the axial position of the light source member 30, and effectively ensuring and improving the accuracy of the dot sight in use.

Embodiment 6

Figure 8:
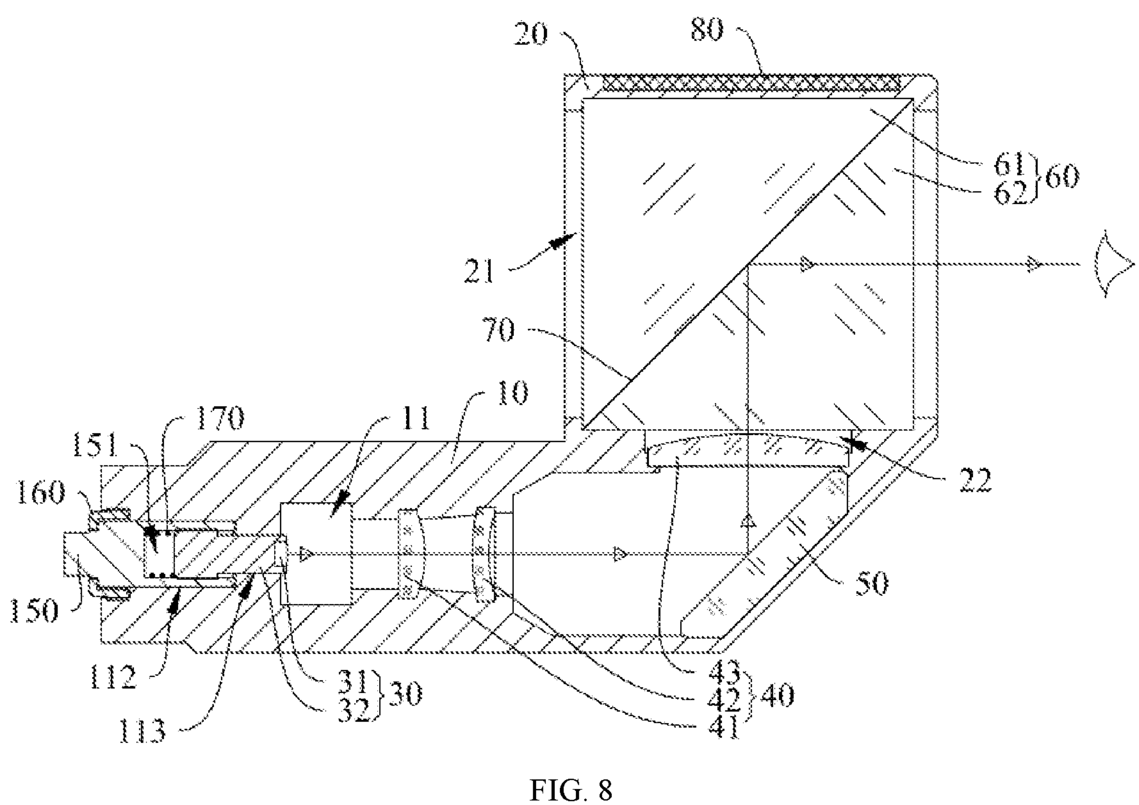
FIG. 8 is a structural schematic view of a dot sight according to Embodiment 6 of the present application.

The embodiment differs from Embodiment 1 in:

Referring to FIG. 8, in the embodiment, the end of the first chamber 11 close to the object side is sequentially provided with second mounting hole 112 and second through hole 113 from the object side to the eye side. In other words, the second mounting hole 112 is formed at the end of the sight mount 10 close to the object side. The second through hole 113 is formed in a bottom of the second mounting hole 112. The second mounting hole 112 and the second through hole 113 form the end of the first chamber 11 close to the object side.

The dot sight further includes second adjusting rod 150 and second pressure ring 160. The second adjusting rod 150 is rotatably provided in the second mounting hole 112. The second pressure ring 160 is connected to an end of the sight mount 10 close to the object side, and restricts the second adjusting rod 150 from moving axially along the second mounting hole 112. An end of the second adjusting rod 150 close to the eye side is provided with axially extending second connecting hole 151. The light source member 30 includes one end connected to the second connecting hole 151, and the other end penetrating through the second through hole 113. The second adjusting rod 150 in rotation can drive the light source member 30 to move axially relative to the second through hole 113.

It is to be noted that the second adjusting rod 150 is provided in the second mounting hole 112, and can rotate around a central axis of the second adjusting rod 150 in the second mounting hole 112 under an external force.

The second pressure ring 160 may be connected to the end of the sight mount 10 close to the object side in a manner including but not limited to threaded connection and/or glue bonding. The second pressure ring 160 presses and abuts against the second adjusting rod 150, and limits the second adjusting rod 150 in the second mounting hole 112. The second pressure ring 160 can particularly restrict the second adjusting rod 150 from moving axially relative to the second mounting hole 112, and can particularly restrict the second adjusting rod 150 from separating from the second mounting hole 112. An end of the second adjusting rod 150 close to the object side is exposed out or protruded from an inner race of the second pressure ring 160, so as to drive the second adjusting rod 150 to rotate under an external force.

The light source member 30 includes one end connected to the second connecting hole 151 of the second adjusting rod 150, and the other end penetrating through the second through hole 113. When the second adjusting rod 150 rotates under an external force, the light source member 30 can move axially relative to the second through hole 113, thereby adjusting the axial position of the light source member 30 relative to the sight mount 10, adjusting the distance from the light source member 30 to the collimator lens set 40, and adjusting the refraction effect of the collimator lens set 40 for the light from the light source member 30. Consequently, the light from the light source member 30 and the light of the target can be superimposed on the retina for imaging. This can effectively eliminate a parallax, can effectively make the parallax fall within an allowed range at different aiming distances, and can effectively ensure and improve an aiming accuracy.

Compared with Embodiment 1, by rotating the second adjusting rod 150, the light source member 30 is driven to move axially in the embodiment. This not only can realize adjustment on the axial position of the light source member 30, but also can keep a region (namely the end of the second adjusting rod 150 close to the object side) for the adjustment of the shooter at the axial position basically unchanged, thereby better facilitating the adjustment of the shooter.

Referring to FIG. 8, in the embodiment, the end of the light source member 30 is threadedly connected to the second connecting hole 151. The second through hole 113 is a non-circular hole, and restricts the light source member 30 from rotating relative to the second through hole 113. The second through hole 113 is the non-circular hole, and may specifically be a polygonal hole or a special-shaped hole. A cross-sectional shape of a portion of the light source member 30 penetrating through the second through hole 113 is the same as a shape of the second through hole 113.

With the above solution, when the second adjusting rod 150 rotates under an external force, since the light source member 30 cannot rotate under the restriction of the second through hole 113, the light source member 30 can move axially relative to the second through hole 113 under driving of a thread of the second connecting hole 151 of the second adjusting rod 150, thereby adjusting the axial position of the light source member 30 relative to the sight mount 10, adjusting the distance from the light source member 30 to the collimator lens set 40, and adjusting the refraction effect of the collimator lens set 40 for the light from the light source member 30. Consequently, the light from the light source member 30 and the light of the target can be superimposed on the retina for imaging. This can effectively eliminate a parallax, can effectively make the parallax fall within an allowed range at different aiming distances, and can effectively ensure and improve an aiming accuracy.

Since the light source member 30 only moves axially relative to the second through hole 113 and does not rotate relative to the second through hole 113, the embodiment is particularly applied to the light source member 30 using a multipoint LED and/or a reticle pattern. As long as the multipoint LED and/or the reticle pattern of the light source member 30 is adjusted well in advance before the dot sight leaves the factory, the multipoint LED and/or the reticle pattern of the light source member 30 can keep an adjusted state without rotation when the axial position of the light source member 30 is adjusted, thereby better ensuring and improving the aiming accuracy. The reticle pattern may be, but is not limited to, a circle-dot reticle pattern, a reticle pattern with a horizontal line and a vertical line, etc.

Since the threaded fit belongs to clearance fit, there is a small clearance between the external thread of the light source member 30 and the corresponding internal thread. Therefore, during adjustment, it is necessary to idle for complementing the clearance, and then rotate, in order to adjust the axial position of the light source member 30 relative to the sight mount 10. However, the clearance and the idling action have an impact on an adjustment accuracy.

Referring to FIG. 8, in the embodiment, the dot sight further includes third spring 170. The third spring 170 is provided in the second connecting hole 151. Two axially opposite ends of the third spring 170 are respectively connected to the light source member 30 and the second adjusting rod 150. With the above solution, the two axially opposite ends of the third spring 170 respectively elastically abut against the light source member 30 and the second adjusting rod 150. Through an elastic abutting force of the third spring 170 for the light source member 30, a tooth of the external thread of the light source 30 tightly abuts against a tooth of a corresponding internal thread. This can effectively eliminate the clearance between the external thread of the light source member 30 and the corresponding internal thread, can effectively ensure and improve an adjustment accuracy for the axial position of the light source member 30, and can effectively ensure and improve an accuracy of the dot sight in use.

In addition, when cooperation between the external thread of the light source 30 and the corresponding internal thread is loose for a large thread machining error, looseness between the external thread of the light source member 30 and the corresponding internal thread can also be effectively alleviated or even prevented based on the embodiment, thereby effectively ensuring and improving the adjustment accuracy for the axial position of the light source member 30, and effectively ensuring and improving the accuracy of the dot sight in use.

Embodiment 7

The embodiment differs from Embodiment 6 in:

Referring to FIG. 8, in the embodiment, the end of the light source member 30 is inserted into the second connecting hole 151. The second connecting hole 151 is a non-circular hole, and restricts the light source member 30 from rotating relative to the second connecting hole 151. The light source member 30 is threadedly connected to the second through hole 113. A cross-sectional shape of a portion of the light source member 30 inserted into the second connecting hole 151 is the same as a shape of the second connecting hole 151. The second connecting hole 151 is the non-circular hole, and may specifically be a polygonal hole or a special-shaped hole.

With the above solution, when the second adjusting rod 150 rotates under an external force, since the light source member 30 cannot deflect under the restriction of the second connecting hole 151 of the second adjusting rod 150, the light source member 30 rotates synchronously with the second adjusting rod 150. The light source member 30 can move axially relative to the second through hole 113 under driving of a thread of the second through hole 113, thereby adjusting the axial position of the light source member 30 relative to the sight mount 10, adjusting the distance from the light source member 30 to the collimator lens set 40, and adjusting the refraction effect of the collimator lens set 40 for the light from the light source member 30. Consequently, the light from the light source member 30 and the light of the target can be superimposed on the retina for imaging. This can effectively eliminate a parallax, can effectively make the parallax fall within an allowed range at different aiming distances, and can effectively ensure and improve an aiming accuracy.

Embodiment 8

The embodiment differs from Embodiment 6 in:

Referring to FIG. 8, in the embodiment, the dot sight further includes third spring 170. The third spring 170 is provided in the second connecting hole 151. Two axially opposite ends of the third spring 170 are respectively connected to the light source member 30 and the sight mount 10.

With the above solution, the two axially opposite ends of the third spring 170 respectively elastically abut against the light source member 30 and the sight mount 10. Through an elastic abutting force of the third spring 170 for the light source member 30, a tooth of the external thread of the light source 30 tightly abuts against a tooth of a corresponding internal thread. This can effectively eliminate the clearance between the external thread of the light source member 30 and the corresponding internal thread, can effectively ensure and improve an adjustment accuracy for the axial position of the light source member 30, and can effectively ensure and improve an accuracy of the dot sight in use.

In addition, when cooperation between the external thread of the light source 30 and the corresponding internal thread is loose for a large thread machining error, looseness between the external thread of the light source member 30 and the corresponding internal thread can also be effectively alleviated or even prevented based on the embodiment, thereby effectively ensuring and improving the adjustment accuracy for the axial position of the light source member 30, and effectively ensuring and improving the accuracy of the dot sight in use.

Embodiment 9

Figure 9:
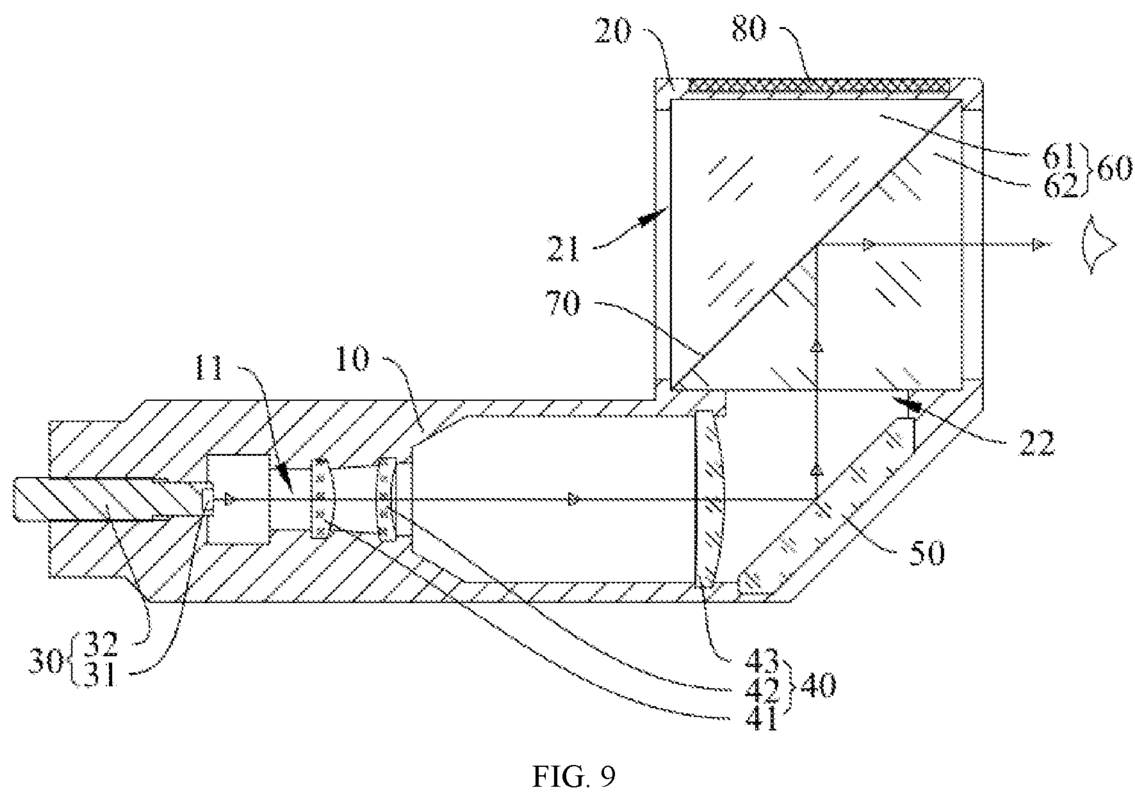
FIG. 9 is a structural schematic view of a dot sight according to Embodiment 9 of the present application.
Figure 10:
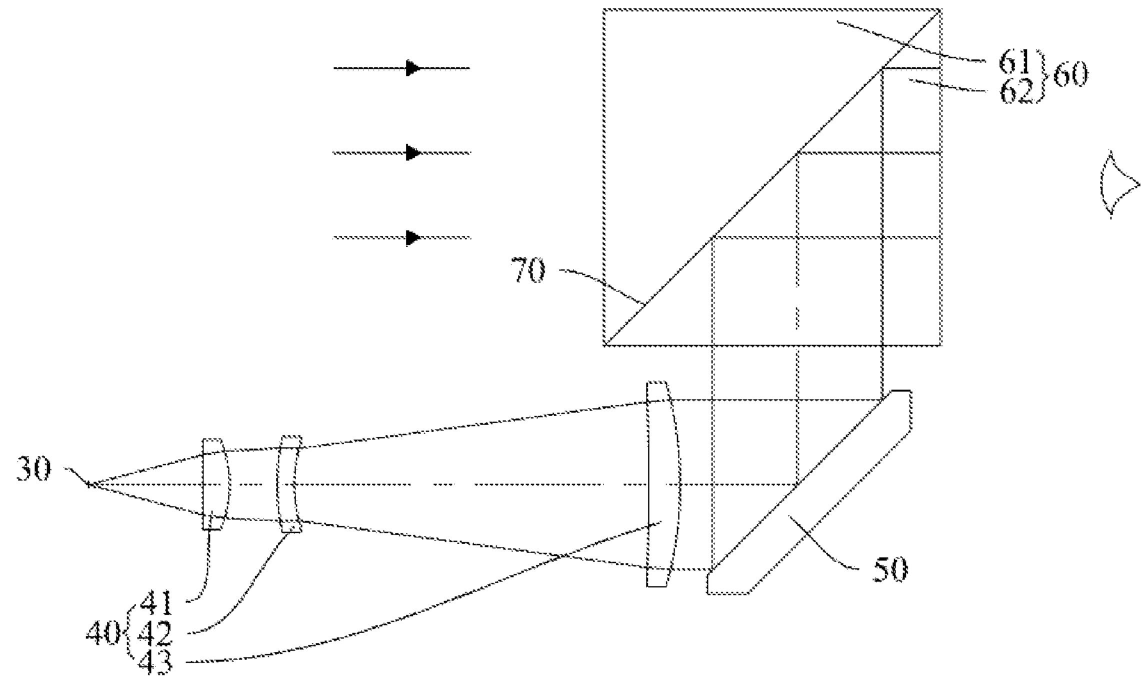
FIG. 10 is a schematic view illustrating a principle when the dot sight in FIG. 9 aims at a distant target.

The embodiment differs from Embodiment 1 in:

Referring to FIG. 9 and FIG. 10, in the embodiment, the collimator lens set 40 includes first lens 41, second lens 42, and third lens 43 sequentially arranged from the object side to the eye side and having a refractive capability. The first lens 41, the second lens 42, and the third lens 43 are provided between the light source member 30 and the reflector 50.

Based on the embodiment, when the light source member 30 emits the light to the collimator lens set 40, the light passes through the first lens 41, and is refracted firstly by the first lens 41. The light passes through the second lens 42, and is refracted secondly by the second lens 42. Then, the light passes through the third lens 43, and is refracted thirdly by the third lens 43. So far, the collimator lens set 40 refracts the light from the light source member 30 completely before the light reaches the reflector 50. By adjusting a distance from the light source member 30 to the first lens 41, a refraction effect of the collimator lens set 40 for the light from the light source member 30 can be changed.

Embodiment 10

Figure 11:
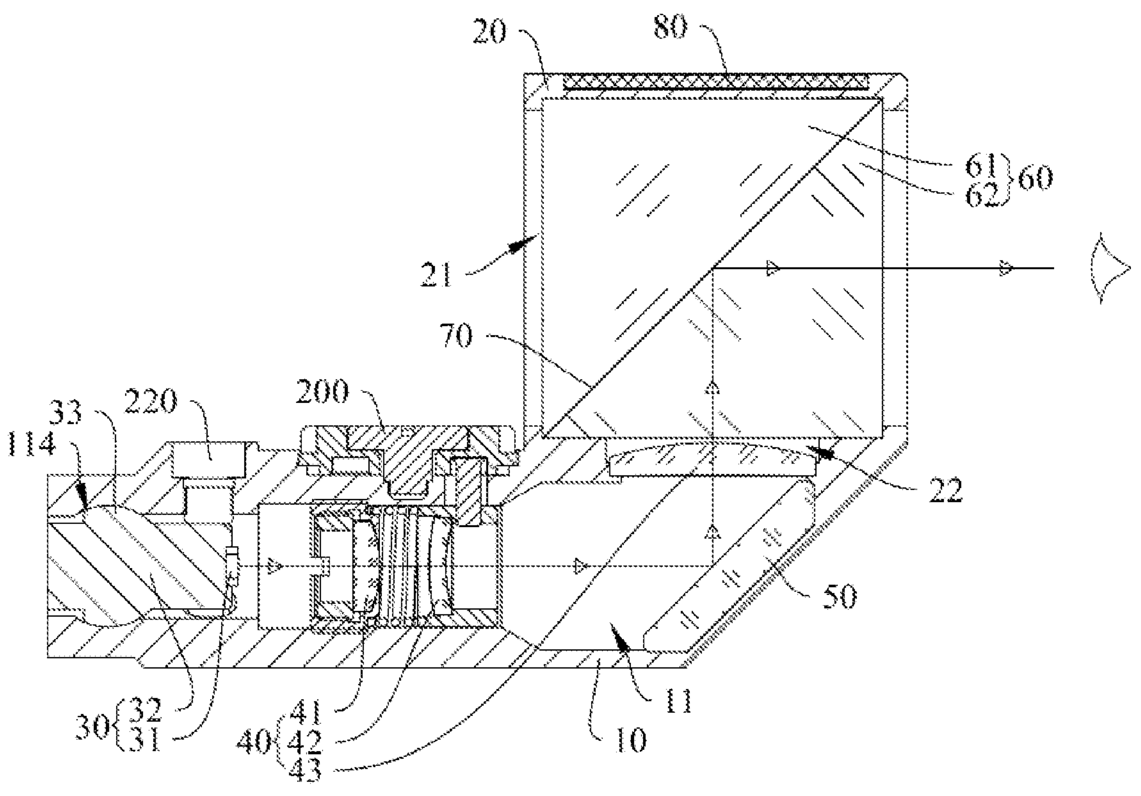
FIG. 11 is a structural schematic view of a dot sight according to Embodiment 10 of the present application.
Figure 12:
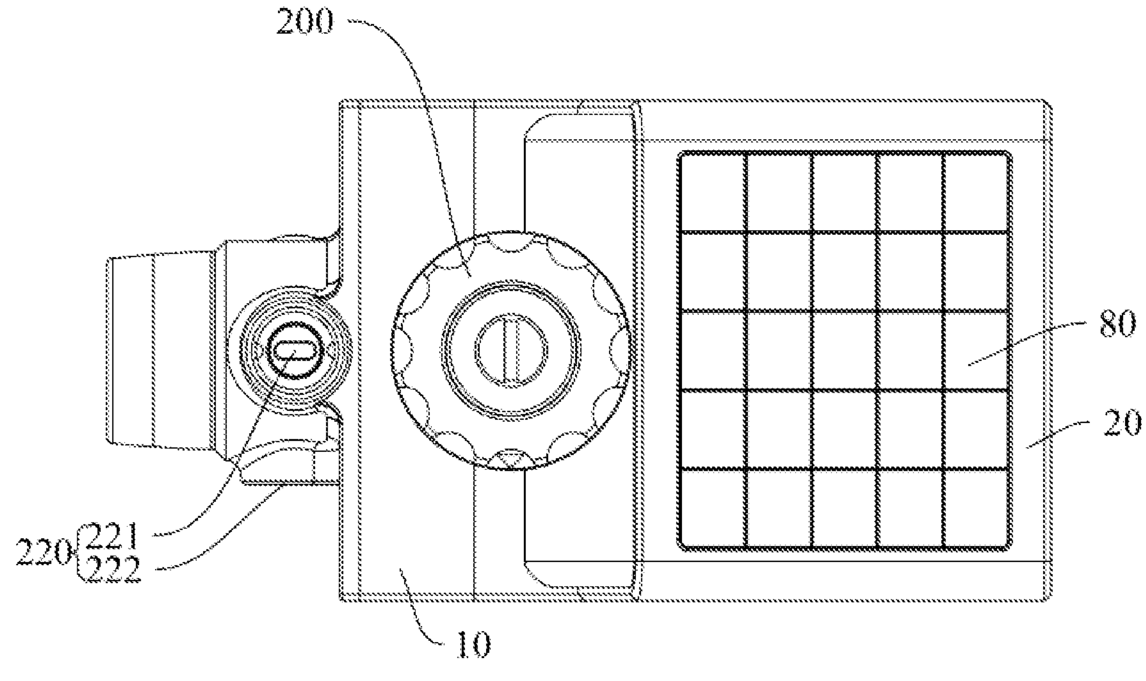
FIG. 12 is a top view of the dot sight in FIG. 11.

Referring to FIG. 11 and FIG. 12, an embodiment of the present application further provides a dot sight, including sight mount 10, sight frame 20, light source member 30, reflector 50, beam splitter prism 60, and collimator lens set 40. First chamber 11 extending along an axial direction of the sight mount is formed in the sight mount 10. The sight frame 20 is provided at a circumferential side of the sight mount 10 close to an eye side. Second chamber 21 penetrating through the sight frame along an axial direction, and through opening 22 communicating the second chamber 21 and the first chamber 11 are formed in the sight frame 20. The light source member 30 is provided at an end of the first chamber 11 close to an object side, and configured to emit light to the eye side. The reflector 50 is provided in the first chamber 11, and corresponding to the through opening 22. The beam splitter prism 60 is provided in the second chamber 21. The beam splitter prism 60 includes first prism 61 and second prism 62 cemented to each other. Reflective film 70 is provided on a cemented plane of the first prism 61 and the second prism 62. The collimator lens set 40 is provided in the first chamber 11. The collimator lens set 40 includes first lens 41, second lens 42, and third lens 43 sequentially arranged and having a refractive capability. The first lens 41 and the second lens 42 are provided between the light source member 30 and the reflector 50. The third lens 43 is provided between the second lens 42 and the beam splitter prism 60. The first lens 41 and the third lens 43 are fixed relative to the sight mount 10. An axial position of the second lens 42 relative to the sight mount 10 is adjustable.

It is to be noted that the light source member 30, the collimator lens set 40, and the reflector 50 are accommodated in the first chamber 11 of the sight mount 10. The sight mount 10 can protect the light source member 30, the collimator lens set 40, and the reflector 50 in the first chamber 11 reliably.

The light source member 30 is provided at the end of the first chamber 11 close to the object side, and configured to emit the light to the collimator lens set 40. Since the light from the light source member 30 faces to the eye side, a bright dot of a target basically cannot be observed from the object side, thereby lowering an exposure risk of a shooter. An axial position of the light source member 30 relative to the sight mount 10 is determined and fixed. The light source member 30 includes light-emitting element 31 for emitting light to the collimator lens set 40, and lamp holder 32 for supporting and fixing the light-emitting element 31. An optical axis of the light-emitting element 31 is aligned at an optical axis of the collimator lens set 40. The light-emitting element 31 may be, but is not limited to, an LED lamp.

The collimator lens set 40 is provided in a space of the first chamber 11 from the light source member 30 to the through opening 22. The collimator lens set 40 is configured to refract the light from the light source member 30. The collimator lens set 40 includes the first lens 41, the second lens 42, and the third lens 43 sequentially arranged and having the refractive capability. The light from the light source member 30 may be refracted repeatedly through the first lens 41, the second lens 42, and the third lens 43 of the collimator lens set 40. Specifically, as shown in FIG. 11, in a first implementation, the first lens 41 and the second lens 42 are provided between the light source member 30 and the reflector 50. The third lens 43 is provided at the through opening 22. Upon this, when the light source member 30 emits the light to the collimator lens set 40, the light passes through the first lens 41, and is refracted firstly by the first lens 41. The light passes through the second lens 42, and is refracted secondly by the second lens 42. Then, the light reaches the reflector 50 and is reflected to the through opening 22 by the reflector 50. The light passes through the third lens 43 at the through opening 22, and is refracted thirdly by the third lens 43. So far, the collimator lens set 40 refracts the light from the light source member 30 completely. Referring to FIG. 9, in a second implementation, the first lens 41, the second lens 42, and the third lens 43 are provided between the light source member 30 and the reflector 50. Upon this, when the light source member 30 emits the light to the collimator lens set 40, the light passes through the first lens 41, and is refracted firstly by the first lens 41. The light passes through the second lens 42, and is refracted secondly by the second lens 42. Then, the light passes through the third lens 43, and is refracted thirdly by the third lens 43. So far, the collimator lens set 40 refracts the light from the light source member 30 completely before the light reaches the reflector 50. Compared with the second implementation, a length of the dot sight can be shortened relatively in the first implementation.

The first lens 41 and the third lens 43 are fixed relative to the sight mount 10. The axial position of the second lens 42 relative to the sight mount 10 is adjustable. When a distance from the second lens 42 to the light source member 30 is an adjusted distance, the second lens 42 can cooperate with the first lens 41 and the third lens 43 to refract the light from the light source member 30 repeatedly into approximately parallel light. Based on the adjusted distance, the second lens 42 is driven to move close to or away from the light source member 30, thereby adjusting the distance from the second lens 42 to the light source member 30, namely changing a refraction effect of the collimator lens set 40 for the light from the light source member 30. For example, the light from the light source member 30 is refracted repeatedly into divergent light.

The reflector 50 corresponds to the through opening 22. The reflector 50 inclines to a central axis of the first chamber 11 and a central axis of the through opening 22. Without a refractive capability, the reflector 50 is mainly configured to reflect and deflect light propagated along the first chamber 11 to the beam splitter prism 60 through the through opening 22.

It is further to be noted that the beam splitter prism 60 is limited and accommodated in the second chamber 21 of the sight frame 20. The sight frame 20 can protect the beam splitter prism 60 in the second chamber 21 reliably.

The beam splitter prism 60 includes the first prism 61 and the second prism 62 cemented to each other. The cemented plane of the first prism 61 and the second prism 62 inclines to a central axis of the second chamber 21 and the central axis of the through opening 22. The reflective film 70 is provided on the cemented plane of the first prism 61 and the second prism 62. The reflective film 70 is configured to reflect light of a specific wavelength and allow light of other wavelengths to penetrate through. Specifically, the reflective film 70 is configured to further reflect light reflected by the reflector 50 to the eye side, and allow target light from an end of the second chamber 21 close to the object side to penetrate through and transmit to the eye side. The reflective film 70 may be provided on the cemented plane of the first prism 61 or the cemented plane of the second prism 62 in a manner including but not limited to coating.

To sum up, the dot sight provided by the embodiment of the present application basically has the following working principle: The dot sight is adjusted in advance according to a distant target when leaving a factory. When the dot sight aims at the distant target, light of the distant target enters the eye side through the second chamber 21 and the reflective film 70 as approximately parallel light. In this case, the axial position of the second lens 42 relative to the sight mount 10 can keep unchanged to maintain the adjusted distance between the light source member 30 and the second lens 42. The light from the light source member 30 can be refracted repeatedly into the approximately parallel light by the first lens 41, the second lens 42 and the third lens 43 in the collimator lens set 40, reflected to the beam splitter prism 60 by the reflector 50, and reflected to the eye side through the reflective film 70 on the cemented plane of the first prism 61 and the second prism 62 of the beam splitter prism 60. For the sake of clear viewing on the target, a human eye automatically adjusts a crystalline lens to image the target on a retina. Since the light from the light source member 30 and the light of the distant target are approximately parallel when entering the eye side, the light from the light source member 30 and the light of the distant target can be superimposed on the retina for imaging. This can effectively eliminate a parallax, and can effectively ensure and improve an aiming accuracy.

On the contrary, when the dot sight aims at a close target, light of the close target enters the eye side through the second chamber 21 and the reflective film 70 as divergent light with a certain divergence angle. In this case, the second lens 42 can be driven to move away from or close to the light source member 30 relative to the sight mount 10 to adjust the distance from the second lens 42 to the light source member 30, and adjust a refraction effect of the collimator lens set 40 for the light from the light source member 30, until "the light from the light source member 30 can be refracted repeatedly into divergent light by the first lens 41, the second lens 42 and the third lens 43 in the collimator lens set 40, and when this light is reflected repeatedly to the eye side by the reflector 50 and the reflective film 70 of the beam splitter prism 60, an incident angle of this light is approximately the same as an angle of the light of the close target for entering the eye side". For the sake of clear viewing on the target, the human eye automatically adjusts the crystalline lens to image the target on the retina. Since the light from the light source member 30 and the light of the close target are the divergent light when entering the eye side, and enter the human eye at the approximately same angle, the light from the light source member 30 and the light of the close target can be superimposed on the retina for imaging. This can effectively eliminate a parallax, and can effectively ensure and improve an aiming accuracy.

Therefore, according to the dot sight provided by the embodiment of the present application, the light source member 30, the collimator lens set 40, and the reflector 50 are provided in the sight mount 10. The beam splitter prism 60 is provided in the sight frame 20. The light source member 30 emits the light to the collimator lens set 40. The light from the light source member 30 is refracted by the collimator lens set 40. The light from the light source member 30 is reflected repeatedly to the eye side through the reflector 50, and the reflective film 70 on the first prism 61 and the second prism 62. This can effectively ensure invisibility of the light source member 30 and the light from the light source member, basically cannot observe the bright dot of the target from the object side, and can effectively lower an exposure risk of the shooter. Upon this, according to the dot sight provided by the embodiment of the present application, in response to different aiming distances, by adjusting the axial position of the second lens 42 of the collimator lens set 40 relative to the sight mount 10 to adjust a distance from the second lens 42 of the collimator lens set 40 to the light source element 30, a refraction effect of the collimator lens set 40 for the light from the light source member 30 can further be adjusted. Consequently, the light from the light source member 30 and the light of the target have an approximately same incident angle when entering the eye side, and the light from the light source member 30 and the light of the target can be superimposed on the retina for imaging. This can effectively eliminate a parallax, can effectively make the parallax fall within an allowed range at different aiming distances, and can effectively ensure and improve the aiming accuracy. Therefore, the dot sight provided by the embodiment of the present application can be applied to an occasion with various aiming distances, and has a wide application range.

In addition, when the existing dot sight aims at the close target, an image at an aiming dot of the dot sight and an image of the target are not superimposed on the retina. In order to clearly view either of the images, the human eye adjusts the crystalline lens continuously. As a result, the eye is easily fatigued, and the dot sight has a poor aiming comfort. In view of this, according to the dot sight provided by the embodiment of the present application, in response to different aiming distances, the axial position of the second lens 42 of the collimator lens set 40 relative to the sight mount 10 can be adjusted, the light from the light source member 30 and the light of the target can be superimposed on the retina for imaging, and the human eye can automatically adjust the crystalline lens and clearly view the image at the aiming point of the dot sight and the image of the target. This can effectively ensure and improve an aiming comfort of the dot sight, and can effectively reduce fatigue of the eye.

Moreover, the existing dot sight generates different and large parallaxes for different aiming distances. When a side of the existing dot sight close to the eye side is provided with a convertible lens, as long as shaking a head slightly to view the convertible lens, the shooter can obviously view that the aiming point of the dot sight moves quickly, is not aligned at the target, and does not have a fixed relative position in an amplified FOV. As a result, the shooter is hard to aim at the target. In view of this, in response to different aiming distances, since the axial position of the second lens 42 of the collimator lens set 40 relative to the sight mount 10 can be adjusted, the dot sight provided by the embodiment of the present application can eliminate the parallax, and can make the parallax fall within the allowed range at the different aiming distances. When a side of the dot sight close to the eye side is provided with a convertible lens, even though shaking a head to view the convertible lens, the shooter can view the aiming point of the dot sight and the target that are amplified by a certain ratio, are aligned and have fixed relative positions in an amplified FOV. This can effectively ensure and improve the aiming accuracy and the aiming comfort of the shooter. Therefore, the dot sight provided by the embodiment of the present application is particularly used in cooperation with the convertible lens, with more prominent advantages.

Figure 13:
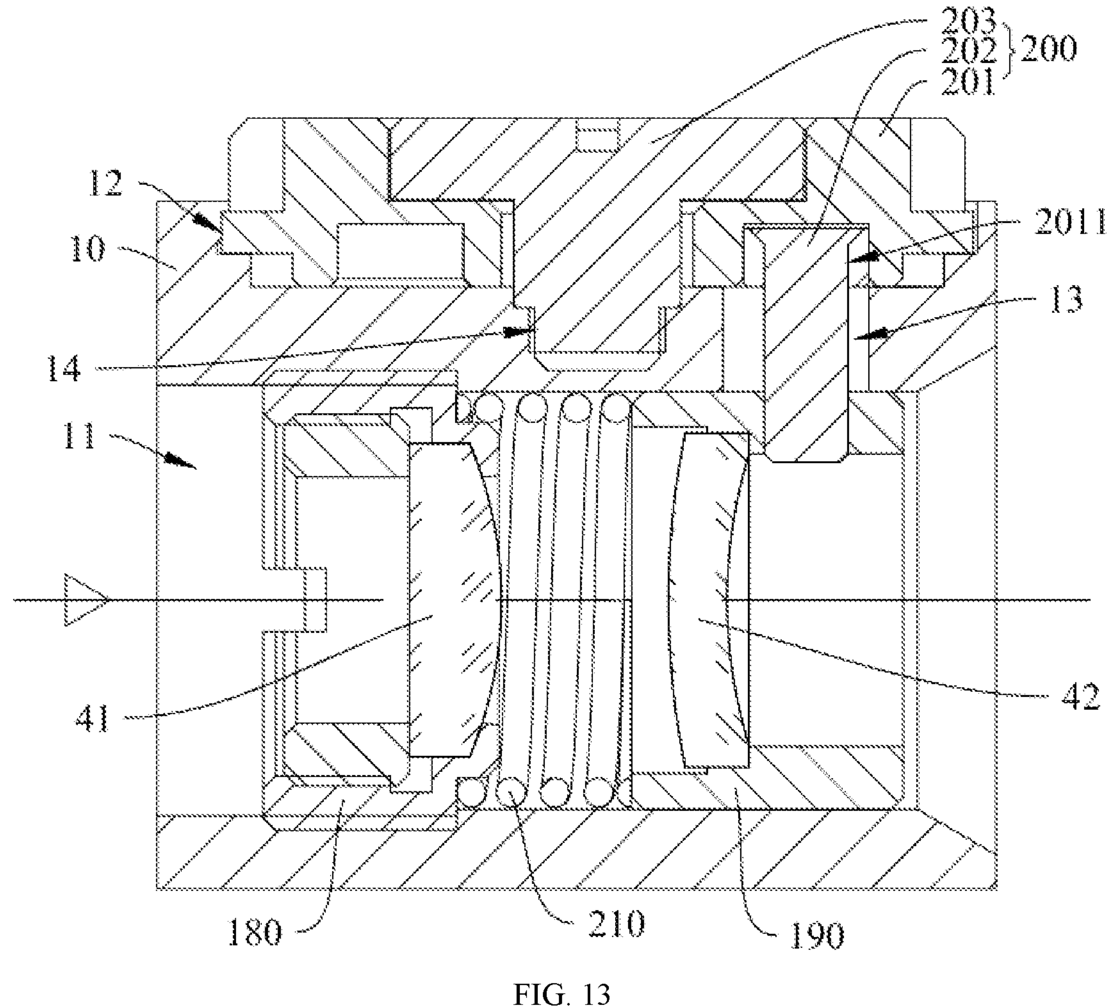
FIG. 13 is a partially structural schematic view of the dot sight in FIG. 11.

Referring to FIG. 11 and FIG. 13, in the embodiment, the collimator lens set 40 further includes first lens holder 180 for mounting the first lens 41, and second lens holder 190 for mounting the second lens 42. The first lens holder 180 is fixedly provided in the first chamber 11. The second lens holder 190 is slidably provided in the first chamber 11.

With the above solution, through the first lens holder 180 for mounting the first lens 41, a mounting state of the first lens 41 relative to the first lens holder 180 is stabilized and fixed. The first lens holder 180 is fixedly provided in the first chamber 11, thereby determining and fixing a mounting position and a mounting state of the first lens 41 relative to the sight mount 10.

With the above solution, through the second lens holder 190 for mounting the second lens 42, a mounting state of the second lens 42 relative to the second lens holder 190 is stabilized and fixed. The second lens holder 190 is slidably provided in the first chamber 11. While an optical axis of the second lens 42 is collimated stably, the axial position of the second lens 42 relative to the sight mount 10 is changed by sliding the second lens holder 190.

Figure 14:
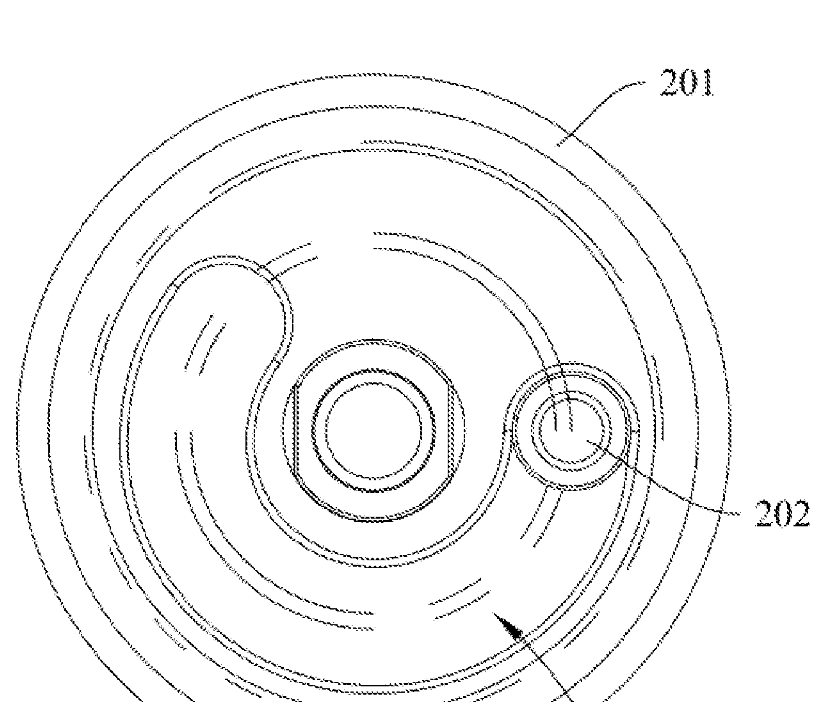
FIG. 14 is a schematic view illustrating cooperation between a focusing handwheel and a deflector rod according to Embodiment 10 of the present application.

Referring to FIG. 11, FIG. 13, and FIG. 14, in the embodiment, third mounting hole 12 is formed in a circumferential surface of the sight mount 10. Third through hole 13 communicated with the first chamber 11 is formed in a bottom of the third mounting hole 12. The third through hole 13 is a waist-shaped hole extending along the axial direction of the sight mount 10. The dot sight further includes focusing mechanism 200. The focusing mechanism 200 includes focusing handwheel 201 and deflector rod 202. The focusing handwheel 201 is rotatably provided in the third mounting hole 12, and is restricted from moving axially along the third mounting hole 12. An end of the focusing handwheel 201 close to the bottom of the third mounting hole 12 is provided with curved groove 2011. The curved groove 2011 extends along a circumferential direction of the focusing handwheel 201. A centerline of the curved groove 2011 is gradually close to a central axis of the focusing handwheel 201. The deflector rod 202 includes one end slidably connected to the curved groove 2011, and the other end penetrating through the third through hole 13 and connected to the second lens holder 190. The focusing handwheel 201 in rotation can drive the second lens holder 190 to slide in the first chamber 11.

It is to be noted that the focusing handwheel 201 is provided in the third mounting hole 12, is restricted from moving along the axial direction of the third mounting hole 12, and can rotate around a central axis of the focusing handwheel 201 in the third mounting hole 12 under an external force.

The deflector rod 202 includes one end slidably connected to the curved groove 2011 of the focusing handwheel 201, and the other end fixedly or detachably connected to the second lens holder 190 through the third through hole 13. Optionally, the deflector rod 202 is threadedly connected to the second lens holder 190. In view of this, when the focusing handwheel 201 rotates in a forward direction (relative to a reverse direction hereinafter), the curved groove 2011 of the focusing handwheel 201 can drive the deflector rod 202 to slide along a side of the curved groove 2011 close to the central axis of the focusing handwheel 201. Since the deflector rod 202 penetrates through the third through hole 13, the third through hole 13 can guide and restrict a moving direction of the deflector rod 202, such that the deflector rod 202 can drive the second lens holder 190 and the second lens 42 to move axially close to the light source member 30. On the contrary, when the focusing handwheel 201 rotates in a reverse direction, the curved groove 2011 of the focusing handwheel 201 can drive the deflector rod 202 to slide along a side of the curved groove 2011 away from the central axis of the focusing handwheel 201. Since the deflector rod 202 penetrates through the third through hole 13, the third through hole 13 can guide and restrict the moving direction of the deflector rod 202, such that the deflector rod 202 can drive the second lens holder 190 and the second lens 42 to move axially away from the light source member 30. Therefore, the axial position of the second lens 42 relative to the sight mount 10 and the light source member 30 can be adjusted quickly and conveniently through the focusing mechanism 200.

Referring to FIG. 11 and FIG. 13, in the embodiment, third connecting hole 14 is formed in the bottom of the third mounting hole 12. The focusing mechanism 200 further includes locking bolt 203. A nail portion of the locking bolt 203 is provided on the focusing handwheel 201 in a penetration manner and threadedly connected to the third connecting hole 14. A head portion of the locking bolt 203 presses the focusing handwheel 201 and restricts the focusing handwheel 201 from moving axially along the third mounting hole 12.

Based on the embodiment, the nail portion of the locking bolt 203 can be threadedly connected to the third connecting hole 14 to stabilize a mounting position and a mounting state of the locking bolt. Upon this, the head of the locking bolt 203 can press and abut against the focusing handwheel 201, thereby limiting the focusing handwheel 201 in the third mounting hole 12. The locking bolt 203 particularly can the focusing handwheel 201 from moving axially relative to the third mounting hole 12, and particularly can restrict the focusing handwheel 201 from separating from the third mounting hole 12.

Referring to FIG. 11 and FIG. 13, in the embodiment, the dot sight further includes fourth spring 210 elastically pressed between the first lens holder 180 and the second lens holder 190.

With the above solution, two axially opposite ends of the fourth spring 210 can respectively elastically abut against the first lens holder 180 and the second lens holder 190, thereby ensuring and improving a stability of the second lens holder 190 in axial movement relative to the sight mount 10, and ensuring and improving a stability of an adjusted axial position of the second lens holder 190 relative to the sight holder 10.

When the deflector rod 202 is threadedly connected to the second lens holder 190, since the threaded fit belongs to clearance fit, there is a small clearance between an external thread of the deflector rod 202 and an internal thread of the second lens holder 190. During adjustment, by idling the focusing handwheel 201 to complement the clearance between the deflector rod 202 and the second lens holder 190, and then rotating the focusing handwheel, the deflector rod 202 can drive the second lens holder 190 and the second lens 42 to move axially relative to the sight mount 10 and the light source member 30. Nevertheless, the clearance and the idling action have an impact on an adjustment accuracy. With the above solution, the two axially opposite ends of the fourth spring 210 respectively elastically abut against the first lens holder 180 and the second lens holder 190. Through an elastic abutting force of the fourth spring 210 for the second lens holder 190, the internal thread of the second lens holder 190 tightly abuts against the external thread of the deflector rod 202. This can effectively eliminate the clearance between the internal thread of the second lens holder 190 and the external thread of the deflector rod 202, can effectively ensure and improve an adjustment accuracy for the axial position of the second lens 42, and can effectively ensure and improve an accuracy of the dot sight in use.

When the deflector rod 202 is threadedly connected to the second lens holder 190, and cooperation between the external thread of the deflector rod 202 and the internal thread of the second lens holder 190 is loose for a large thread machining error, looseness between the external thread of the deflector rod 202 and the internal thread of the second lens holder 190 can also be effectively alleviated or even prevented with the above solution, thereby effectively ensuring and improving the adjustment accuracy for the axial position of the second lens 42, and effectively ensuring and improving the accuracy of the dot sight in use.

Referring to FIG. 11 and FIG. 12, in the embodiment, second ball head 33 is provided convexly at a circumferential side of the light source member 30. Second ball socket 114 is provided concavely on a wall of the first chamber 11. The second ball head 33 is hinged to the second ball socket 114. The dot sight further includes second adjustment mechanism 220 provided at an end of the light source member 30 close to the eye side. The second adjustment mechanism 220 is configured to drive the light source member 30 to rotate.

It is to be noted that the second ball head 33 of the light source member 30 is hinged to the second ball socket 114 and cannot be separated from the second ball socket 114. When an end of the light source member 30 is stressed, the light source member 30 can rotate stably and reliably around the second ball head 33 for a certain amplitude.

Penetrating through the sight mount 10 and provided at the end of the light source member 30 close to the eye side, the second adjustment mechanism 220 may be configured to apply an acting force to the end of the light source member 30 close to the eye side, so as to drive the light source member 30 to rotate around the second ball head 33 for a controllable amplitude. Therefore, the optical axis of the light source member 30 is aligned at the optical axis of the collimator lens set 40 conveniently and controllably. This can effectively eliminate an assembly error, can effectively ensure and improve an accuracy of a position for the aiming point of the dot sight, and can effectively ensure and improve the aiming accuracy.

The second adjustment mechanism 220 includes second ballistic adjusting bolt 221 and second windage adjusting bolt 222. Provided at a side of the light source member 30 along a vertical direction, the second ballistic adjusting bolt 221 may be configured to apply a vertical acting force to the end of the light source member 30 close to the eye side, so as to realize displacement adjustment of the light source member 30 and particularly the optical axis of the light source member 30 in the vertical direction. Provided at a side of the light source member 30 along a horizontal direction, the second windage adjusting bolt 222 may be configured to apply a horizontal acting force to the end of the light source member 30 close to the eye side, so as to realize displacement adjustment of the light source member 30 and particularly the optical axis of the light source member 30 in the horizontal direction. Through the second adjustment mechanism 220, the optical axis of the light source member 30 can be aligned at the optical axis of the collimator lens set 40 quickly and conveniently.

The above described are merely preferred embodiments of the present application, and are not intended to limit the present application. Any modification, equivalent substitution, improvement, and the like without departing from the spirit and principle of the present application should fall within the protection scope of the present application.

What is claimed is:

1. A dot sight, comprising:

a sight mount, wherein a first chamber extending along an axial direction of the sight mount is formed in the sight mount, and an end of the first chamber close to an object side communicates with the outside;

a sight frame provided at a circumferential side of the sight mount close to an eye side, wherein a second chamber penetrating through the sight frame along an axial direction, and a through opening communicating the second chamber and the first chamber are formed in the sight frame;

a light source member provided at the end of the first chamber close to the object side, and configured to emit light to the eye side, wherein an axial position of the light source member relative to the sight mount is adjustable;

a collimator lens set provided in the first chamber, and provided at a side of the light source member close to the eye side;

a reflector provided in the first chamber, and corresponding to the through opening; and a beam splitter prism provided in the second chamber, wherein the beam splitter prism comprises a first prism and a second prism cemented to each other, and a reflective film is provided on a cemented plane of the first prism and the second prism, wherein the light source member is threadedly connected to the sight mount.

2. The dot sight according to claim 1, wherein the collimator lens set comprises a first lens, a second lens, and a third lens sequentially arranged from the object side to the eye side and having a refractive capability;

the first lens and the second lens are provided between the light source member and the reflector; and the third lens is provided at the through opening; or the first lens, the second lens, and the third lens are provided between the light source member and the reflector.

3. The dot sight according to claim 1, wherein the dot sight further comprises a battery and/or a solar panel electrically connected to the light source member and configured to supply power to the light source member.

4. A dot sight, comprising:

a sight mount, wherein a first chamber extending along an axial direction of the sight mount is formed in the sight mount, and an end of the first chamber close to an object side communicates with the outside;

a sight frame provided at a circumferential side of the sight mount close to an eye side, wherein a second chamber penetrating through the sight frame along an axial direction, and a through opening communicating the second chamber and the first chamber are formed in the sight frame;

a light source member provided at the end of the first chamber close to the object side, and configured to emit light to the eye side, wherein an axial position of the light source member relative to the sight mount is adjustable;

a collimator lens set provided in the first chamber, and provided at a side of the light source member close to the eye side;

a reflector provided in the first chamber, and corresponding to the through opening; and a beam splitter prism provided in the second chamber, wherein the beam splitter prism comprises a first prism and a second prism cemented to each other, and a reflective film is provided on a cemented plane of the first prism and the second prism, wherein the dot sight further comprises an inner tube provided at the end of the first chamber close to the object side, and a first adjustment mechanism provided at an end of the inner tube close to the eye side; a first ball head is provided convexly at a circumferential side of the inner tube; a first ball socket is provided concavely on a wall of the first chamber; the first ball head is hinged to the first ball socket; the first adjustment mechanism is configured to drive the inner tube to rotate; a third chamber penetrating through the inner tube along an axial direction is formed in the inner tube; the light source member is provided in the third chamber; and an axial position of the light source member relative to the inner tube is adjustable.

5. The dot sight according to claim 4, wherein the light source member is threadedly connected to the inner tube.

6. The dot sight according to claim 5, wherein the dot sight further comprises a first spring; the first spring is provided in the third chamber; and two axially opposite ends of the first spring are respectively connected to the light source member and the inner tube.

7. The dot sight according to claim 4, wherein the third chamber comprises a first mounting hole and a first through hole sequentially arranged from the object side to the eye side; and the dot sight further comprises a first adjusting rod and a first pressure ring; the first adjusting rod is rotatably provided in the first mounting hole; the first pressure ring is connected to an end of the inner tube close to the object side, and restricts the first adjusting rod from moving axially along the first mounting hole; an end of the first adjusting rod close to the eye side is provided with an axially extending first connecting hole; the light source member comprises one end connected to the first connecting hole, and the other end penetrating through the first through hole; and the first adjusting rod in rotation drives the light source member to move axially relative to the first through hole.

8. The dot sight according to claim 7, wherein an end of the light source member is threadedly connected to the first connecting hole; and the first through hole is a non-circular hole, and restricts the light source member from rotating relative to the first through hole; or an end of the light source member is inserted into the first connecting hole; the first connecting hole is a non-circular hole, and restricts the light source member from rotating relative to the first connecting hole; and the light source member is threadedly connected to the first through hole.

9. The dot sight according to claim 8, wherein the dot sight further comprises a second spring; the second spring is provided in the first connecting hole; and two axially opposite ends of the second spring are respectively connected to the light source member and the first adjusting rod, or the two axially opposite ends of the second spring are respectively connected to the light source member and the inner tube.

10. A dot sight, comprising:

a sight mount, wherein a first chamber extending along an axial direction of the sight mount is formed in the sight mount, and an end of the first chamber close to an object side communicates with the outside;

a sight frame provided at a circumferential side of the sight mount close to an eye side, wherein a second chamber penetrating through the sight frame along an axial direction, and a through opening communicating the second chamber and the first chamber are formed in the sight frame;

a light source member provided at the end of the first chamber close to the object side, and configured to emit light to the eye side, wherein an axial position of the light source member relative to the sight mount is adjustable;

a collimator lens set provided in the first chamber, and provided at a side of the light source member close to the eye side;

a reflector provided in the first chamber, and corresponding to the through opening; and a beam splitter prism provided in the second chamber, wherein the beam splitter prism comprises a first prism and a second prism cemented to each other, and a reflective film is provided on a cemented plane of the first prism and the second prism, wherein the end of the first chamber close to the object side is sequentially provided with a second mounting hole and a second through hole from the object side to the eye side; and the dot sight further comprises a second adjusting rod and a second pressure ring; the second adjusting rod is rotatably provided in the second mounting hole; the second pressure ring is connected to an end of the sight mount close to the object side, and restricts the second adjusting rod from moving axially along the second mounting hole; an end of the second adjusting rod close to the eye side is provided with an axially extending second connecting hole; the light source member comprises one end connected to the second connecting hole, and the other end penetrating through the second through hole; and the second adjusting rod in rotation drives the light source member to move axially relative to the second through hole.

11. The dot sight according to claim 10, wherein an end of the light source member is threadedly connected to the second connecting hole; and the second through hole is a non-circular hole, and restricts the light source member from rotating relative to the second through hole; or an end of the light source member is inserted into the second connecting hole; the second connecting hole is a non-circular hole, and restricts the light source member from rotating relative to the second connecting hole; and the light source member is threadedly connected to the second through hole.

12. The dot sight according to claim 11, wherein the dot sight further comprises a third spring; the third spring is provided in the second connecting hole; and two axially opposite ends of the third spring are respectively connected to the light source member and the second adjusting rod, or the two axially opposite ends of the third spring are respectively connected to the light source member and the sight mount.

13. A dot sight, comprising:

a sight mount, wherein a first chamber extending along an axial direction of the sight mount is formed in the sight mount;

a sight frame provided at a circumferential side of the sight mount close to an eye side, wherein a second chamber penetrating through the sight frame along an axial direction, and a through opening communicating the second chamber and the first chamber are formed in the sight frame;

a light source member provided at an end of the first chamber close to an object side, and configured to emit light to the eye side;

a reflector provided in the first chamber, and corresponding to the through opening;

a beam splitter prism provided in the second chamber, wherein the beam splitter prism comprises a first prism and a second prism cemented to each other, and a reflective film is provided on a cemented plane of the first prism and the second prism; and a collimator lens set provided in the first chamber, wherein the collimator lens set comprises a first lens, a second lens, and a third lens sequentially arranged and having a refractive capability; the first lens and the second lens are provided between the light source member and the reflector; the third lens is provided between the second lens and the beam splitter prism; the first lens and the third lens are fixed relative to the sight mount; and an axial position of the second lens relative to the sight mount is adjustable.

14. The dot sight according to claim 13, wherein the collimator lens set further comprises a first lens holder for mounting the first lens, and a second lens holder for mounting the second lens; the first lens holder is fixedly provided in the first chamber; and the second lens holder is slidably provided in the first chamber.

15. The dot sight according to claim 14, wherein a third mounting hole is formed in a circumferential surface of the sight mount; a third through hole communicated with the first chamber is formed in a bottom of the third mounting hole; and the third through hole is a waist-shaped hole extending along the axial direction of the sight mount; and the dot sight further comprises a focusing mechanism; the focusing mechanism comprises a focusing handwheel and a deflector rod; the focusing handwheel is rotatably provided in the third mounting hole, and is prevented from axial movement along the third mounting hole; an end of the focusing handwheel close to the bottom of the third mounting hole is provided with a curved groove; the curved groove extends along a circumferential direction of the focusing handwheel; a centerline of the curved groove is gradually close to a central axis of the focusing handwheel; the deflector rod comprises one end slidably connected to the curved groove, and the other end penetrating through the third through hole and connected to the second lens holder; and the focusing handwheel in rotation drives the second lens holder to slide in the first chamber.

16. The dot sight according to claim 15, wherein a third connecting hole is formed in the bottom of the third mounting hole; and the focusing mechanism further comprises a locking bolt; a nail portion of the locking bolt is provided on the focusing handwheel in a penetration manner and threadedly connected to the third connecting hole; and a head portion of the locking bolt presses the focusing handwheel and restricts the focusing handwheel from moving axially along the third mounting hole.

17. The dot sight according to claim 14, wherein the dot sight further comprises a fourth spring elastically pressed between the first lens holder and the second lens holder.

18. The dot sight according to claim 13, wherein a second ball head is provided convexly at a circumferential side of the light source member; a second ball socket is provided concavely on a wall of the first chamber; the second ball head is hinged to the second ball socket; the dot sight further comprises a second adjustment mechanism provided at an end of the light source member close to the eye side; and the second adjustment mechanism is configured to drive the light source member to rotate.

* * * * *